US012749226B2

(12) United States Patent
Rondao Alface et al.

(10) Patent No.: US 12,749,226 B2
(45) Date of Patent: Sep. 29, 2026

(54) V-DMC DISPLACEMENT RECTANGULAR PACKING

(71) Applicant: Nokia Technologies Oy, Espoo (FI)

(72) Inventors: Patrice Rondao Alface, Evere (BE); Lukasz Kondrad, Munich (DE); Lauri Aleksi Ilola, Tampere (FI); Emre Baris Aksu, Tampere (FI); Aleksei Martemianov, Ylöjärvi (FI); Kashyap Kammachi Sreedhar, Tampere (FI)

(73) Assignee: Nokia Technologies Oy, Espoo (FI)

( * ) Notice: Subject to any disclaimer, the term of this patent is extended or adjusted under 35 U.S.C. 154(b) by 202 days.

(21) Appl. No.: 18/819,549

(22) Filed: Aug. 29, 2024

(65) Prior Publication Data

US 2025/0111547 A1 Apr. 3, 2025

Related U.S. Application Data

(60) Provisional application No. 63/541,366, filed on Sep. 29, 2023.

(51) Int. Cl.
*G06T 9/00* (2006.01)

(52) U.S. Cl.
CPC .................................... *G06T 9/001* (2013.01)

(58) Field of Classification Search
None
See application file for complete search history.

(56) References Cited

U.S. PATENT DOCUMENTS

2024/0236355 A9* 7/2024 Joshi .................... H04N 19/463
2024/0357177 A1* 10/2024 Joshi .................... H04N 19/176
2025/0005803 A1* 1/2025 Tokumo .................. G06T 9/001

FOREIGN PATENT DOCUMENTS

WO WO-2025071369 A1 * 4/2025 ........... H04N 19/597

OTHER PUBLICATIONS

ISO/IEC JTC1/SC29/WG07 "Text of ISO/IEC CD 23090-29 Video-Based Mesh Coding" Apr. 2024.
ISO/IEC JTC1/SC29/WG 07 "Information Technology—Coded Representation of Immersive Media—Part 5: Visual Volumetric Video-Based Coding (V3C) and Video-Based Point Cloud Compression (V-PCC)" [retrieved Sep. 2024].

* cited by examiner

*Primary Examiner* — Zhihan Zhou
(74) *Attorney, Agent, or Firm* — Nokia Technologies Oy

(57) ABSTRACT

An apparatus includes at least one processor; and at least one memory storing instructions that, when executed by the at least one processor, cause the apparatus at least to: receive mesh data; determine a number of subdivisions for the mesh data, wherein a subdivision of the subdivisions comprises a level of detail level, wherein the number of subdivisions comprises a subdivision count; calculate displacement values for the subdivisions; pack the displacement values for the subdivisions in a rectangular region of a video frame; encode the video frame; and signal in or along a video-based dynamic mesh coding bitstream mapping information indicating a relation between displacement values for level of detail levels and regions of the video frame.

41 Claims, 19 Drawing Sheets

V-DMC DISPLACEMENT RECTANGULAR PACKING

RELATED APPLICATION

This application claims priority to U.S. Provisional Application No. 63/541,366, filed Sep. 29, 2023, which is hereby incorporated by reference in its entirety.

TECHNICAL FIELD

The examples and non-limiting embodiments relate generally to multimedia transport and, more particularly, to V-DMC displacement rectangular packing.

BACKGROUND

It is known to perform data compression and decoding in a multimedia system.

SUMMARY

In accordance with an aspect, an apparatus includes at least one processor; and at least one memory storing instructions that, when executed by the at least one processor, cause the apparatus at least to: receive mesh data; determine a number of subdivisions for the mesh data, wherein a subdivision of the subdivisions comprises a level of detail level, wherein the number of subdivisions comprises a subdivision count; calculate displacement values for the subdivisions; pack the displacement values for the subdivisions in a rectangular region of a video frame; encode the video frame; and signal in or along a video-based dynamic mesh coding bitstream mapping information indicating a relation between displacement values for level of detail levels and regions of the video frame.

In accordance with an aspect, an apparatus includes at least one processor; and at least one memory storing instructions that, when executed by the at least one processor, cause the apparatus at least to: receive a video-based dynamic mesh coding bitstream comprising mesh data; extract from the video-based dynamic mesh coding bitstream a number of level of detail levels and mapping information indicating a relation between displacement values for the level of detail levels and regions of a video frame; receive level of detail information, wherein the level of detail information comprises a level of detail threshold; extract and decode the displacement values as indicated by the mapping information from a video substream corresponding to level of detail levels that are below or equal to the level of detail threshold; and reconstruct a level of detail level of the mesh data using the extracted and decoded displacement values.

In accordance with an aspect, a method includes receiving mesh data; determining a number of subdivisions for the mesh data, wherein a subdivision of the subdivisions comprises a level of detail level, wherein the number of subdivisions comprises a subdivision count; calculating displacement values for the subdivisions; packing the displacement values for the subdivisions in a rectangular region of a video frame; encoding the video frame; and signaling in or along a video-based dynamic mesh coding bitstream mapping information indicating a relation between displacement values for level of detail levels and regions of the video frame.

In accordance with an aspect, a method includes receiving a video-based dynamic mesh coding bitstream comprising mesh data; extracting from the video-based dynamic mesh coding bitstream a number of level of detail levels and mapping information indicating a relation between displacement values for the level of detail levels and regions of a video frame; receiving level of detail information, wherein the level of detail information comprises a level of detail threshold; extracting and decoding the displacement values as indicated by the mapping information from a video substream corresponding to level of detail levels that are below or equal to the level of detail threshold; and reconstructing a level of detail level of the mesh data using the extracted and decoded displacement values.

BRIEF DESCRIPTION OF THE DRAWINGS

The foregoing embodiments and other features are explained in the following description, taken in connection with the accompanying drawings, wherein.

DETAILED DESCRIPTION OF EXAMPLE EMBODIMENTS

Figure 1:
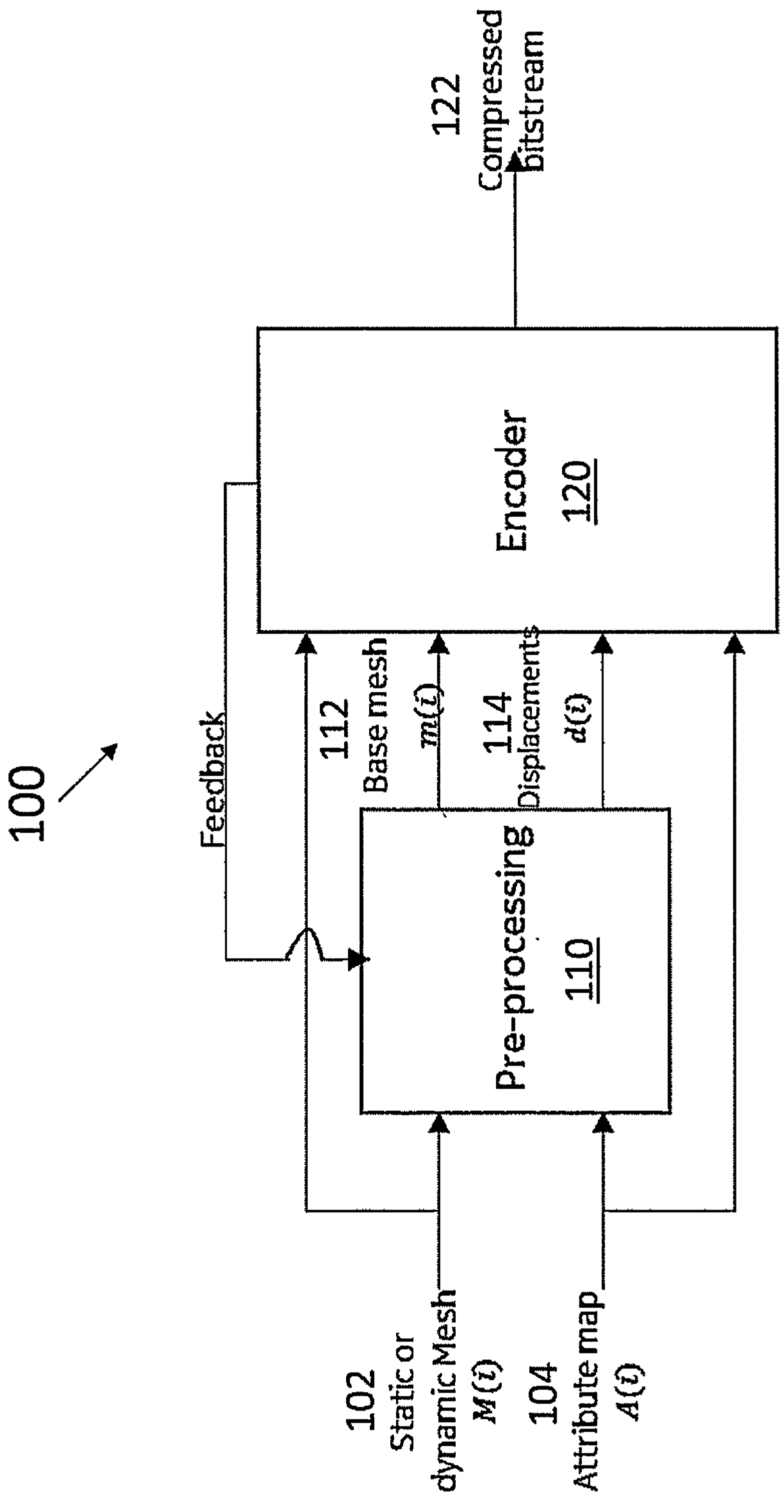
FIG. 1 depicts an example encoding process.

The examples described herein to volumetric video, particularly to the new standard called Video-based Dynamic Mesh Coding (V-DMC) ISO/IEC 23090-29, which is a new application of the Visual Volumetric Video Coding (V3C) standard family ISO/IEC 23090-5.

ISO/IEC 23090-5: Visual Volumetric Video-Based Coding (V3C)

Visual volumetric video, a sequence of visual volumetric frames, if uncompressed, may be represented by a large amount of data, which can be costly in terms of storage and transmission. This has led to the need for a high coding efficiency standard for the compression of visual volumetric data.

V3C specification enables the representation of a variety of volumetric media by using video and image coding technologies. This is achieved through first a conversion of such media from their corresponding 3D representation to multiple 2D representations, also referred to as V3C components, before coding such information. Such representations may include occupancy, geometry, and attribute components. The occupancy component can inform a V3C decoding and/or rendering system of which samples in the 2D components are associated with data in the final 3D representation. The geometry component contains information about the precise location of 3D data in space, while attribute components can provide additional properties, e.g., texture or material information, of such 3D data.

Additional information that allows associating all these subcomponents and enables the inverse reconstruction, from a 2D representation back to a 3D representation is also included in a special component, referred to in this document as the atlas. An atlas consists of multiple elements, named as patches. Each patch identifies a region in all available 2D components and contains information necessary to perform the appropriate inverse projection of this region back to the 3D space. The shape of such regions is determined through a 2D bounding box associated with each patch as well as their coding order. The shape of these regions is also further refined after the consideration of the occupancy information.

Coded V3C video components are referred to in this document as video bitstreams, while a V3C atlas component is referred to as the atlas bitstream. Video bitstreams and atlas bitstreams may be further split into smaller units, referred to here as video and atlas sub-bitstreams, respectively, and may be interleaved together, after the addition of appropriate delimiters, to construct a V3C bitstream.

V3C patch information is contained in atlas bitstream, which contains a sequence of NAL units. NAL unit is specified to format data and provide header information in a manner appropriate for conveyance on a variety of communication channels or storage media. A NAL unit specifies a generic format for use in both packet-oriented and bitstream systems. The format of NAL units for both packet-oriented transport and sample streams is identical except that in the sample stream format specified in Annex D of ISO/IEC 23090-5 each NAL unit can be preceded by an additional element that specifies the size of the NAL unit.

NAL units in atlas bitstream can be divided to atlas coding layer (ACL) and non-atlas coding layer (non-ACL) units. The former is dedicated to carry patch data while the latter is used to carry data necessary to properly parse the ACL units or any additional auxiliary data. NAL unit is identified by type that is specified in Table 4 of ISO/IEC 23090-5.

While designing V3C specification it was envisaged that amendments or new editions can be created in the future. In order to ensure that the first implementations of V3C decoders are compatible with any future extension, a number of fields for future extensions to parameter sets were reserved.

ISO/IEC 23090-29: Video-Based Dynamic Mesh Coding (V-DMC)

The V-DMC consists of: generating a base mesh that is a simplified (low resolution) mesh approximation of the original mesh, called base mesh (this is done for all frames of the dynamic mesh sequence) $m_i$, performing several mesh subdivision iterative steps (e.g., each triangle is converted into four triangles by connecting the triangle edge midpoints) on the generated base mesh, generating other approximation meshes $m''_i$; where n stands for the number of iterations with $m_i = m^0_i$, defining displacement vectors di, also named error vectors, for each vertex of each mesh approximation $m''_i$ with n>0, noted $d'''_i$, for each subdivision level, the deformed mesh, obtained by $m''_i + d''_i$, i.e., by adding the displacement vectors to the subdivided mesh vertices generates the best approximation of the original mesh at that resolution, given the base mesh and prior subdivision levels, the displacement vectors, may undergo a lazy wavelet transform prior to compression, the attribute map of the original mesh is transferred to the deformed mesh at the highest resolution (i.e., subdivision level) such that texture coordinates are obtained for the deformed mesh and a new attribute map is generated.

Referring to FIG. 1, the encoding process can be separated into two main modules: the pre-processing module 110 and the actual encoder module 120 as illustrated on FIG. 1. The encoder 100 is composed of pre-processing module 110 that generates a base mesh 112 and the displacement vectors 114, given the input mesh sequence 102 and its attribute maps 104. The encoder module 120 generates the compressed bitstream 122 by ingesting the inputs (102, 104) and outputs (112, 114) of the pre-processing module (110).

Figure 2:
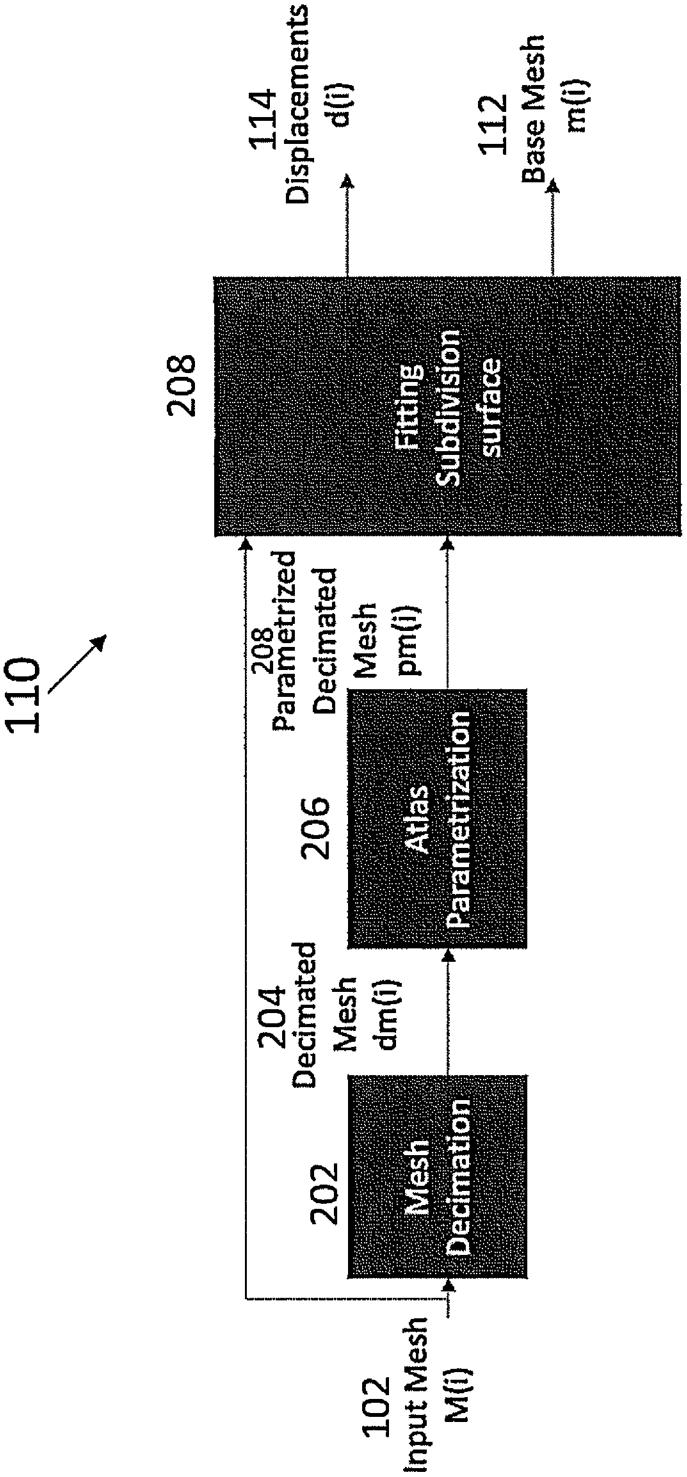
FIG. 2 shows pre-processing steps at the encoder.

Referring to FIG. 1 and FIG. 2, the pre-processing 110 consists in mainly three steps: decimation 202 (reducing the original mesh resolution to produce a base mesh 204), isocharting 206 (creating a 2D parameterization 208 of the base mesh) and the subdivision surface fitting 208 as illustrated on FIG. 2. Thus, FIG. 2 shows the pre-processing operations 110 at the encoder 100.

Figure 3:
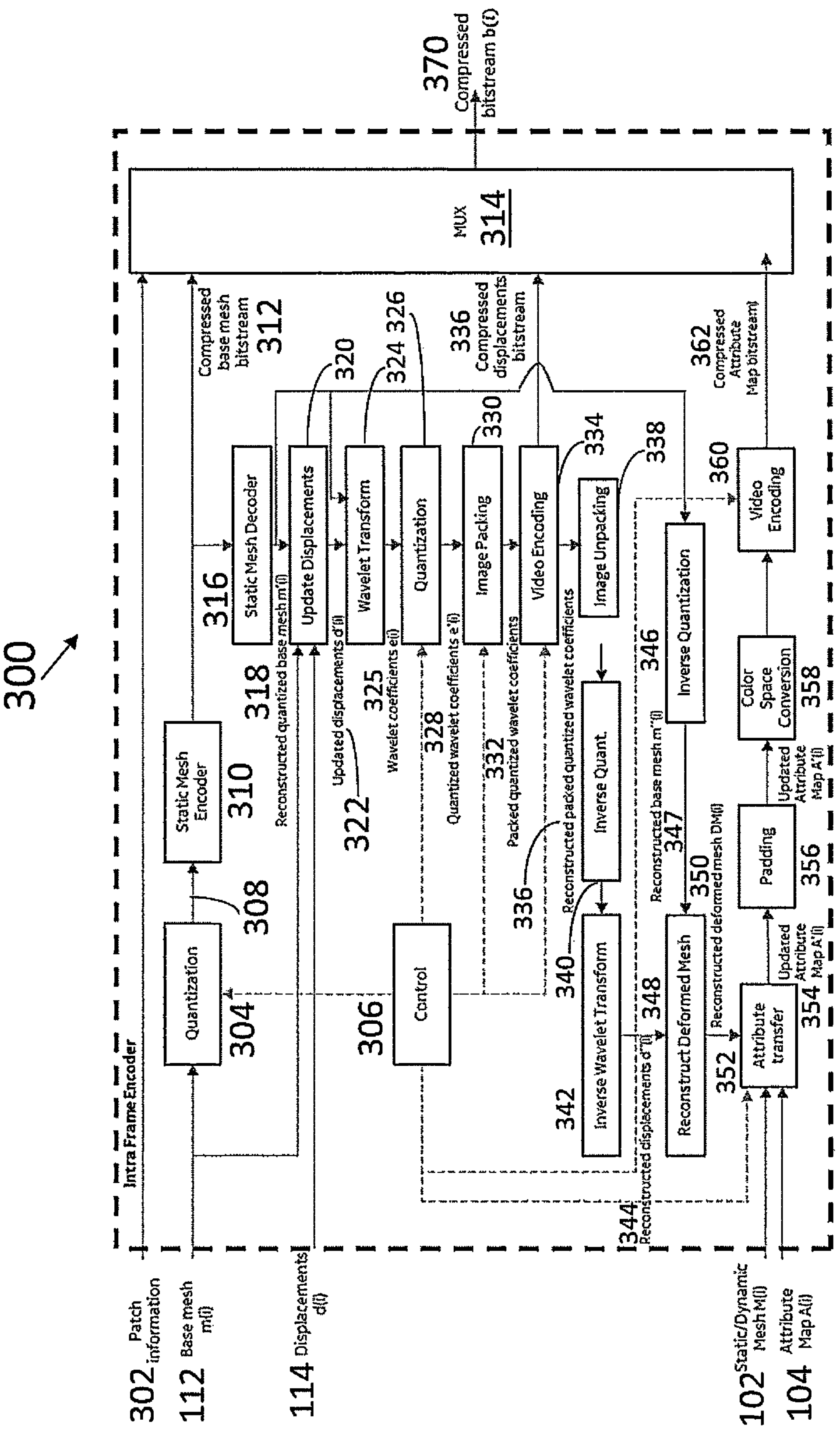
FIG. 3 is a block diagram of an intra frame encoder scheme.
Figure 4:
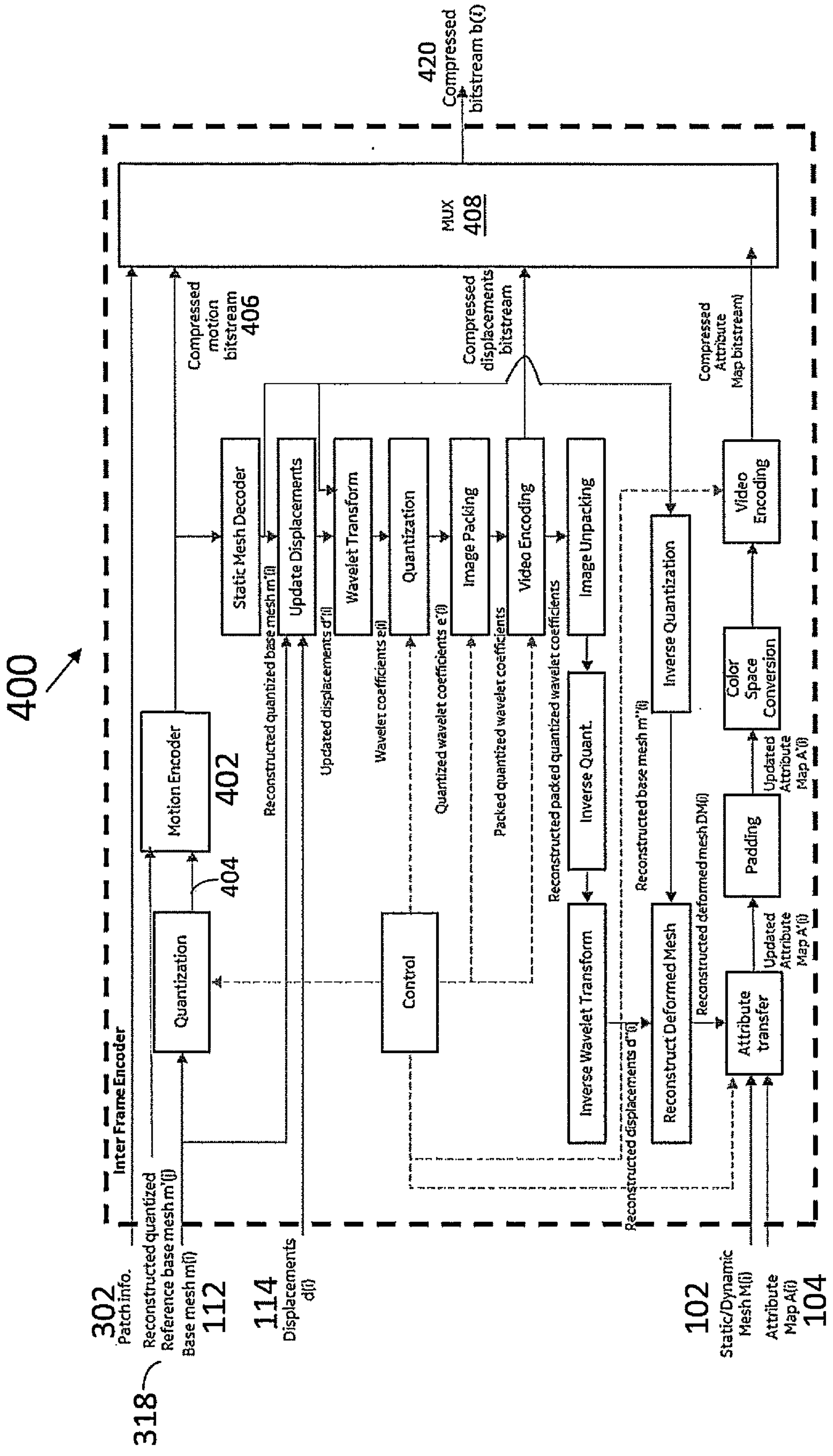
FIG. 4 is a block diagram of an inter frame encoder scheme.

The encoder is illustrated on FIG. 3 and FIG. 4 for the INTRA and INTER case respectively. In the latter, the base mesh connectivity of the first frame of a group of frames is imposed to the subsequent frame's base meshes to improve compression performance.

FIG. 3 shows an intra frame encoder scheme, or the encoder process for INTRA frame encoding. Inputs to this module 300 are the base mesh 112 (that is an approximation of the input mesh but that contains less faces and vertices), the patch information 302 related to the input base mesh 112, the displacements 114, the static/dynamic input mesh frame 102 and the attribute map 104. Outputs of this module is a compressed bitstream 370 that contains a V3C extended signaling sub-bitstream including patch data information 302, a compressed base mesh substream 312, a compressed displacement video component substream 336 and a compressed Attribute video component sub-bitstream 362. The module 300 takes the input base mesh 112 and first quantize its data in the Quantization module 304, which can be dynamically tuned by a Control Module 306. The quantized base mesh 308 is then encoded with the static mesh encoder module 310, which outputs a compressed base mesh sub-bitstream that is muxed by multiplexer 314 in the output bitstream 370. The encoded base mesh 312 is decoded in the Static Mesh Decoder module 316 that generates a reconstructed quantized base mesh 318. The Update Displacements module 320 takes as input the reconstructed quantized base mesh 318, the pristine base mesh 112 and the input displacements 114 to generate new updated displacements 322 that are remapped to the reconstructed base mesh data 318 in order to avoid precision errors due to the static mesh encoding 310 and decoding 316 process. The updated displacements 322 are filtered with a wavelet transform in the Wavelet Transform module 324 (that also takes as input the reconstructed base mesh 318) and then the wavelet coefficients 325 quantized in the Quantization module 326. The quantized wavelet coefficients 328 produced from the updated displacements 322 are then packed into a video component in the Image Packing module 330. This video component (the packed quantized wavelet coefficients 332) is then encoded with a 2D video encoder such as HEVC, VVC, etc., in the Video Encoder module 334, and the output compressed displacement video component sub-bitstream 336 is muxed with multiplexer 314 along with the V3C signaling information sub-bitstream into the output compressed bitstream 370. Then the compressed displacement video component 336 is first decoded and reconstructed and then unpacked into encoded and quantized wavelet coefficients in the Image Unpacking module 338. These wavelet coefficients are then unquantized in the inverse quantization module 340 and reconstructed with the inverse wavelet transform module 342 that generates reconstructed displacements 344. The reconstructed base mesh 318 is unquantized in the inverse quantization module 346 and the unquantized base mesh 347 is combined with the reconstructed displacements 344 in the Reconstruct Deformed Mesh module 348 to obtain the reconstructed deformed mesh 350. This reconstructed deformed mesh 350 is then fed into the Attribute Transfer module 352 together with the Attribute map 104 produced by the pre-processing 110 and the input static/dynamic mesh frame 192. The output of the Attribute Transfer module 352 is an updated attribute map 354 that now corresponds to the reconstructed deformed mesh frame 350. The updated attribute map 354 is then padded, undergoes color conversion, and is encoded as a video component with a 2D video codec such as HEVC or VVC, in the Padding 356, Color Conversion 358 and Video encoder 360 modules respectively. The output compressed attribute map bitstream 362 is multiplexed by multiplexer 314 into the encoder output bitstream 370.

FIG. 4 shows an inter frame encoder scheme, similar to the intra case, but with the base mesh connectivity being constrained for all frames of a group of frames. A motion encoder is used to efficiently encode displacements between base meshes compared to the base mesh of the first frame of the group of frames.

The inter encoding process is similar to the intra encoding process with the following changes. The reconstructed reference base mesh is an input of the inter coding process 400. A new module called Motion Encoder 402 takes as input the quantized input base mesh 404 and the reconstructed quantized reference base mesh 318 to produce compressed motion information encoded as a compressed motion bitstream 406, which is multiplexed by multiplexer 408 into the encoder output compressed bitstream 420. All other modules and processes are similar to the intra encoding case.

The compressed bitstream generated by the encoder multiplexes: a sub-bitstream with the encoded base mesh using a static mesh codec, a sub-bitstream with the encoded motion data using an animation codec for base meshes in case INTER coding is enabled, a sub-bitstream with the wavelet coefficients of the displacement vectors packed in an image and encoded using a video codec, a sub-bitstream with the attribute map encoded using a video codec, and a sub-bitstream that contains all metadata required to decode and reconstruct the mesh sequence based on the aforementioned sub-bitstreams. The signaling of the metadata is based on the V3C syntax and includes necessary extensions that are specific to meshes.

Figure 5:
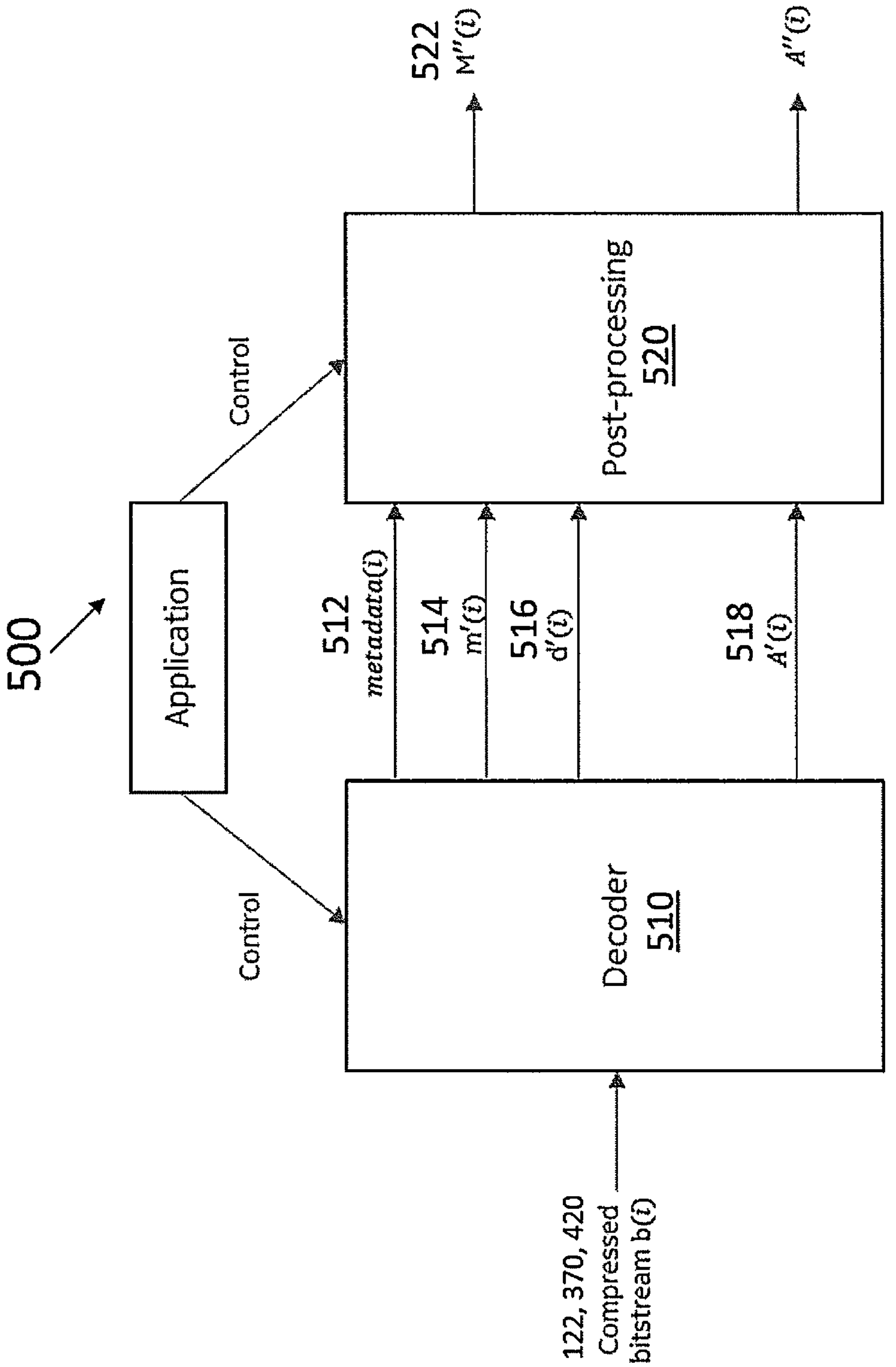
FIG. 5 shows an example decoder scheme.

FIG. 5 shows a decoder scheme (or decoder apparatus 500) composed of a decoder module 510 that demuxes and decodes all sub-streams and a post-processing module 520 that reconstructs the dynamic mesh sequence. The decoding process is illustrated on FIG. 5. First the compressed bitstream (122, 370, 420) is demultiplexed by decoder 510 into sub-bitstreams that are reconstructed, i.e., metadata 512, reconstructed base mesh 514, reconstructed displacements 516 and the reconstructed attribute map data 518. The reconstruction of the mesh sequence 522 is performed based on that data in the post-processing module 520.

Figure 6:
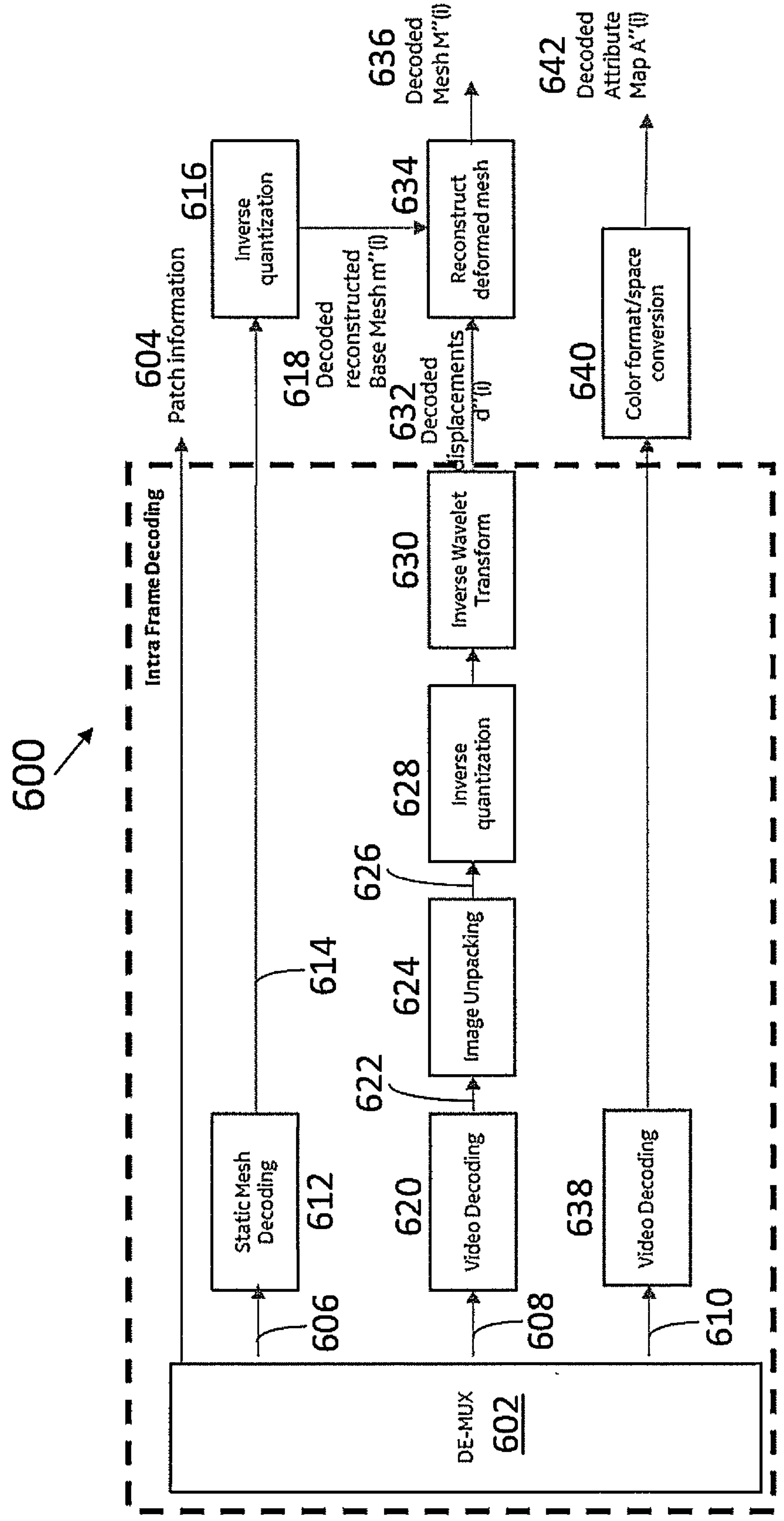
FIG. 6 illustrates the decoding process in intra mode.
Figure 7:
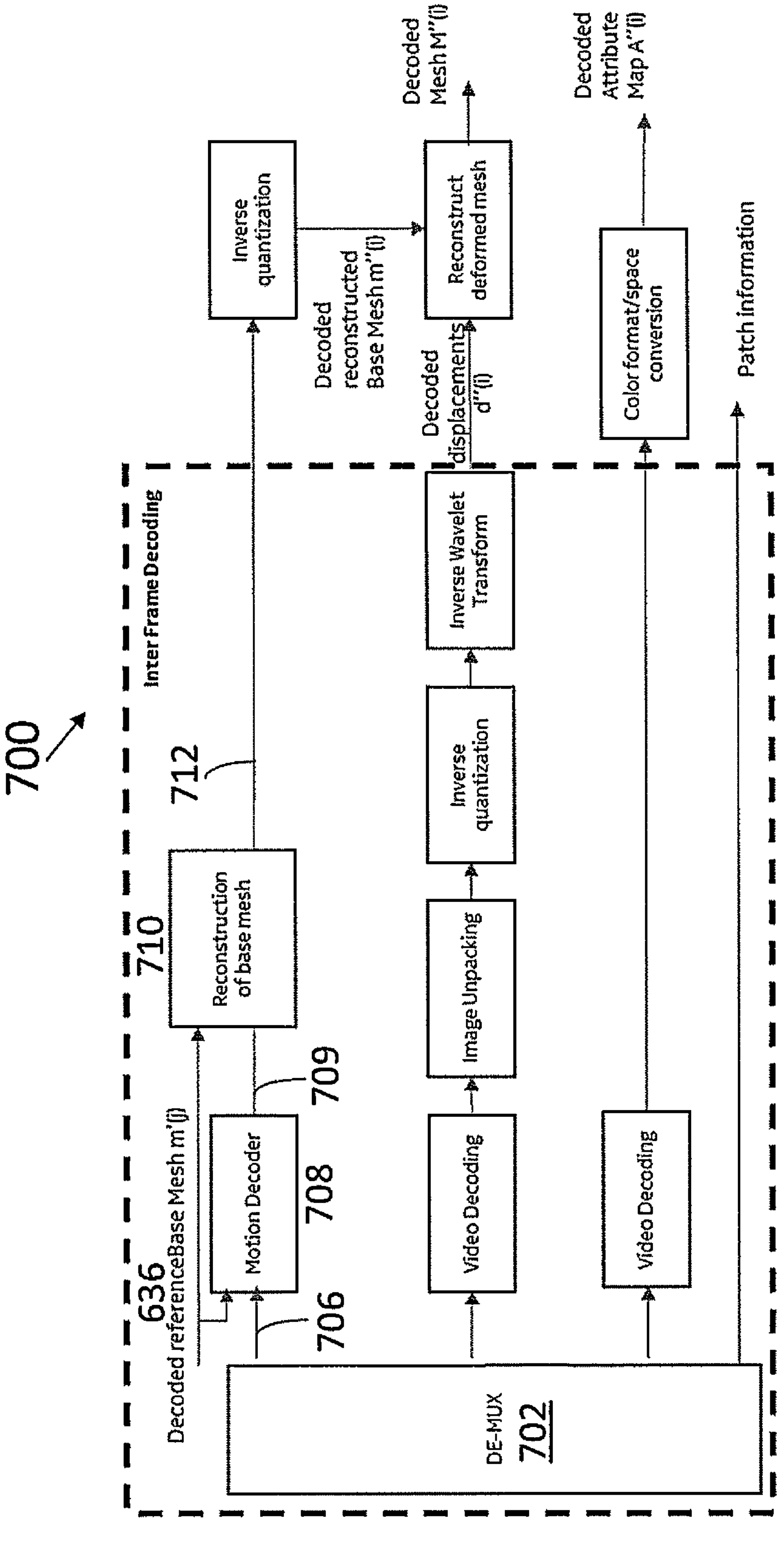
FIG. 7 illustrates the decoding process in inter mode.

FIG. 6 and FIG. 7 illustrate the decoding process in INTRA and INTER mode respectively.

FIG. 6 shows the decoding process in intra mode. The intra frame decoding process 600 consists in the following modules and processes. First the input compressed bitstream (122, 370, 420) is de-multiplexed by demultiplexer 602 into V3C extended atlas data information (or patch information 604), a compressed static mesh bitstream 606, a compressed displacement video component 608 and a compressed attribute map bitstream 610, respectively. The static mesh decoding module 612 converts the compressed static mesh bitstream 606 into a reconstructed quantized static mesh 614, which represents a base mesh. This reconstructed quantized base mesh 614 undergoes inverse quantization in the inverse quantization module 616 to produce a decoded reconstructed base mesh 618. The compressed displacement video component bitstream 608 is decoded in the video decoding module 620 to generate a reconstructed displacement video component 622. This displacement video component 622 is unpacked into reconstructed quantized wavelet coefficients 626 in the image unpacking module 624. Reconstructed quantized wavelet coefficients 626 are inverse quantized in the inverse quantization module 628 and then undergo an inverse wavelet transform in the inverse wavelet transform module 630, that produces decoded displacement vectors 632. The reconstruct deformed mesh module 634 takes into account the patch information 604 and takes as input the decoded reconstructed base mesh 618 and decoded displacement vectors 632 to produce the output decoded mesh frame 636. The compressed attribute map video component 610 is decoded 638, and possibly undergoes color conversion 640 to produce a decoded attribute map frame 642 that corresponds to the decoded mesh frame 636.

FIG. 7 shows the decoding process in inter mode. The inter decoding process 700 is similar to the intra decoding process module 600 with the following changes. The decoder 700 also demultiplexes with demultiplexer 702 a compressed information bitstream (122, 370, 420). A decoded reference base mesh 636 is taken as input of a motion decoder module 708 together with the compressed motion information sub-bitstream 706. This decoded reference base mesh 636 is selected from a buffer of previously decoded base mesh frames (by the intra decoder process 600 for the first frame of a group of frames). The reconstruction of base mesh module 710 takes the decoded reference base mesh 636 and the decoded motion information 709 as input to produce a decoded reconstructed quantized base mesh 712. All other processes are similar to the intra decoding process.

The signaling of the metadata and substreams produced by the encoder and ingested by the decoder is an extension of V3C. It is as follows and mainly consists in additional V3C unit header syntax, additional V3C unit payload syntax, and Mesh Intra patch data unit.

Base meshes are the output of the base mesh substream decoder. A submesh is a set of vertices, their connectivity and the associated attributes which can be decoded completely independently in a mesh frame. Each base mesh can have one or more submeshes.

Resampled base meshes are the output of the mesh subdivision process. The one or more inputs to the process is the base meshes (or sets of submeshes) as well as the information from the atlas data substream on how to subdivide/resample the meshes (submeshes).

A displacement video is the output of the displacement decoder. The inputs to the process is the decoded geometry video as well the information from the atlas data substream on how to interpret/process this video. The displacement video contains displacement values to be added to the corresponding vertices.

Figure 8:
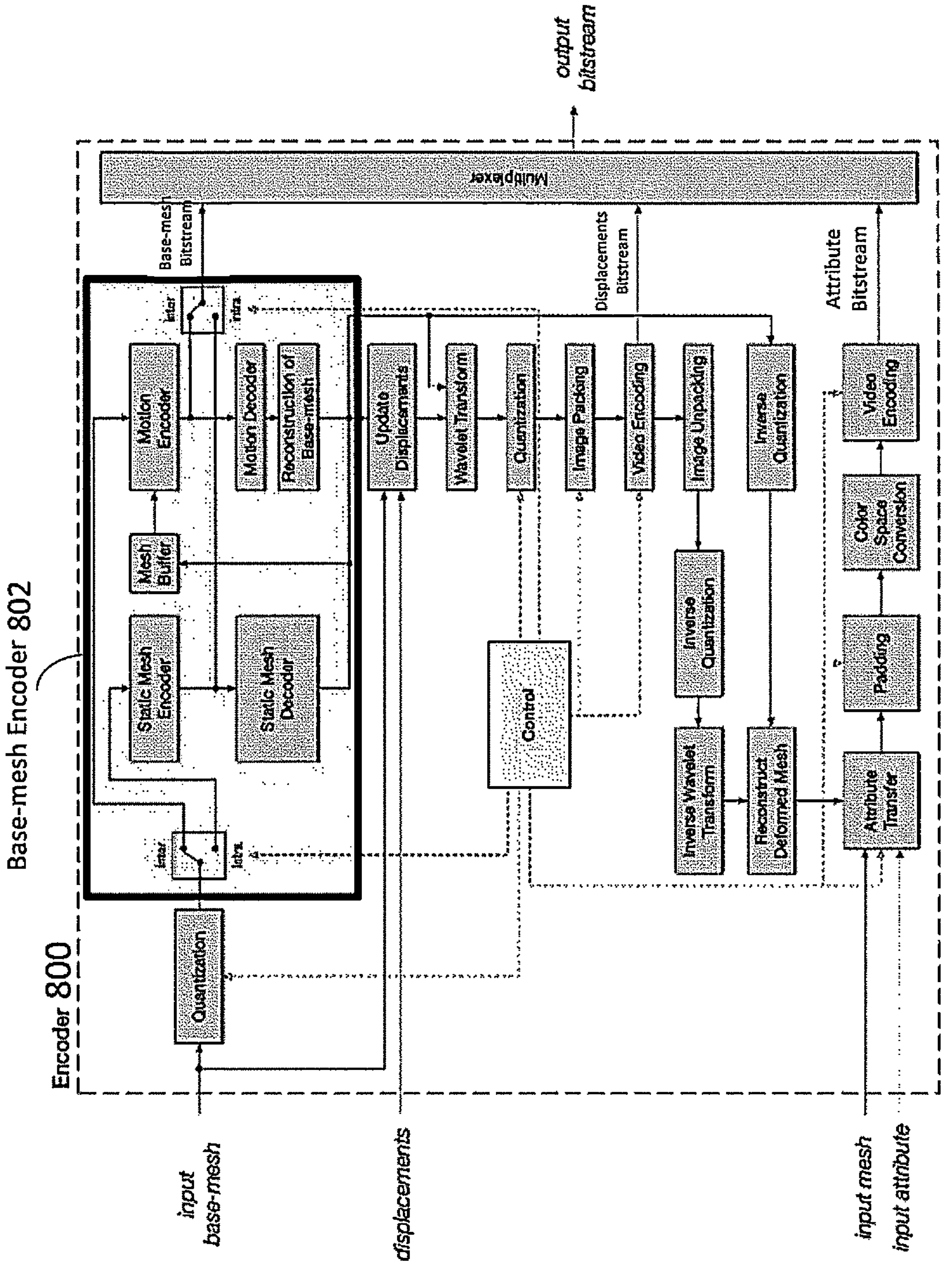
FIG. 8 shows a base mesh encoder in the VDMC encoder.
Figure 9:
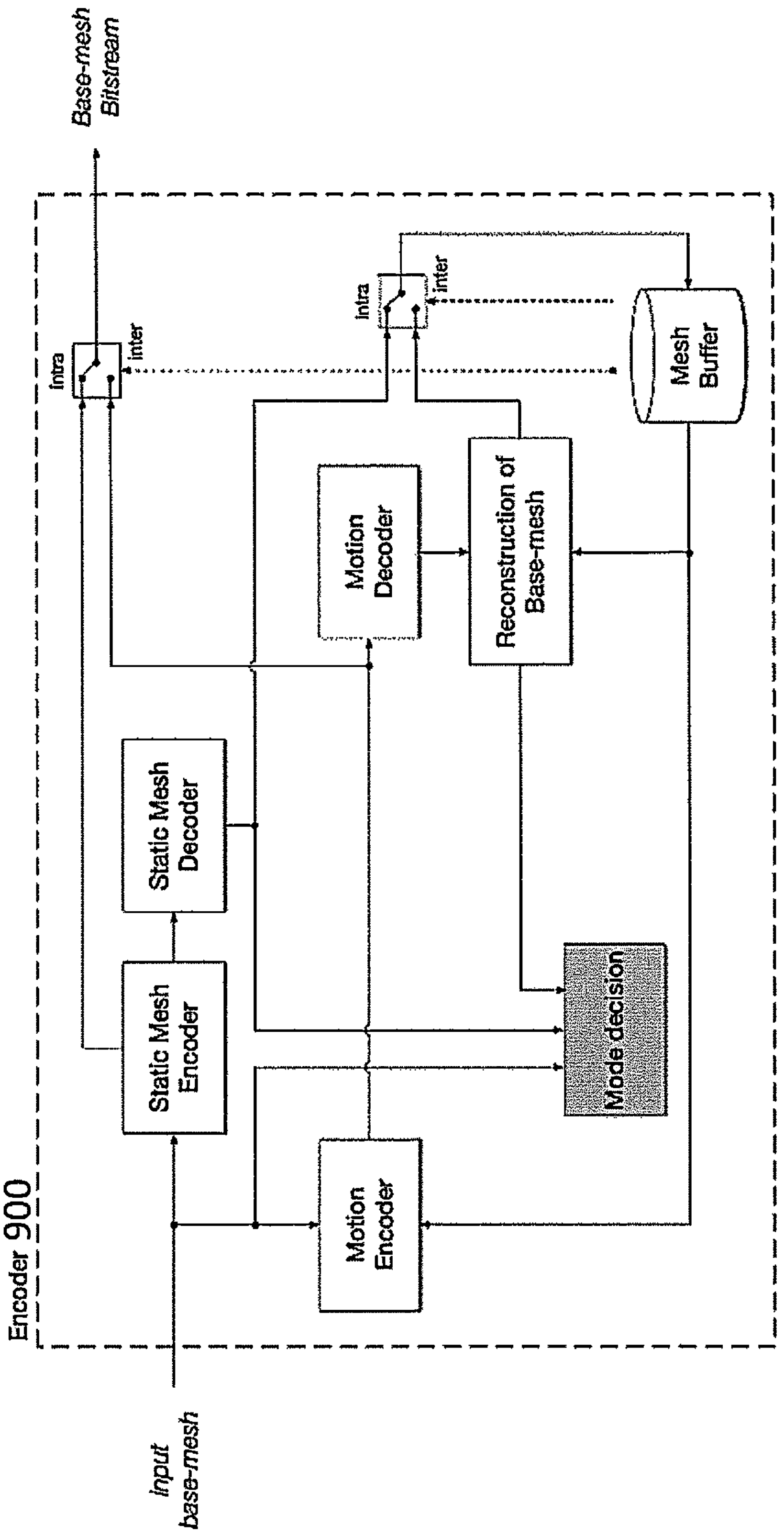
FIG. 9 shows an example base mesh encoder.
Figure 10:
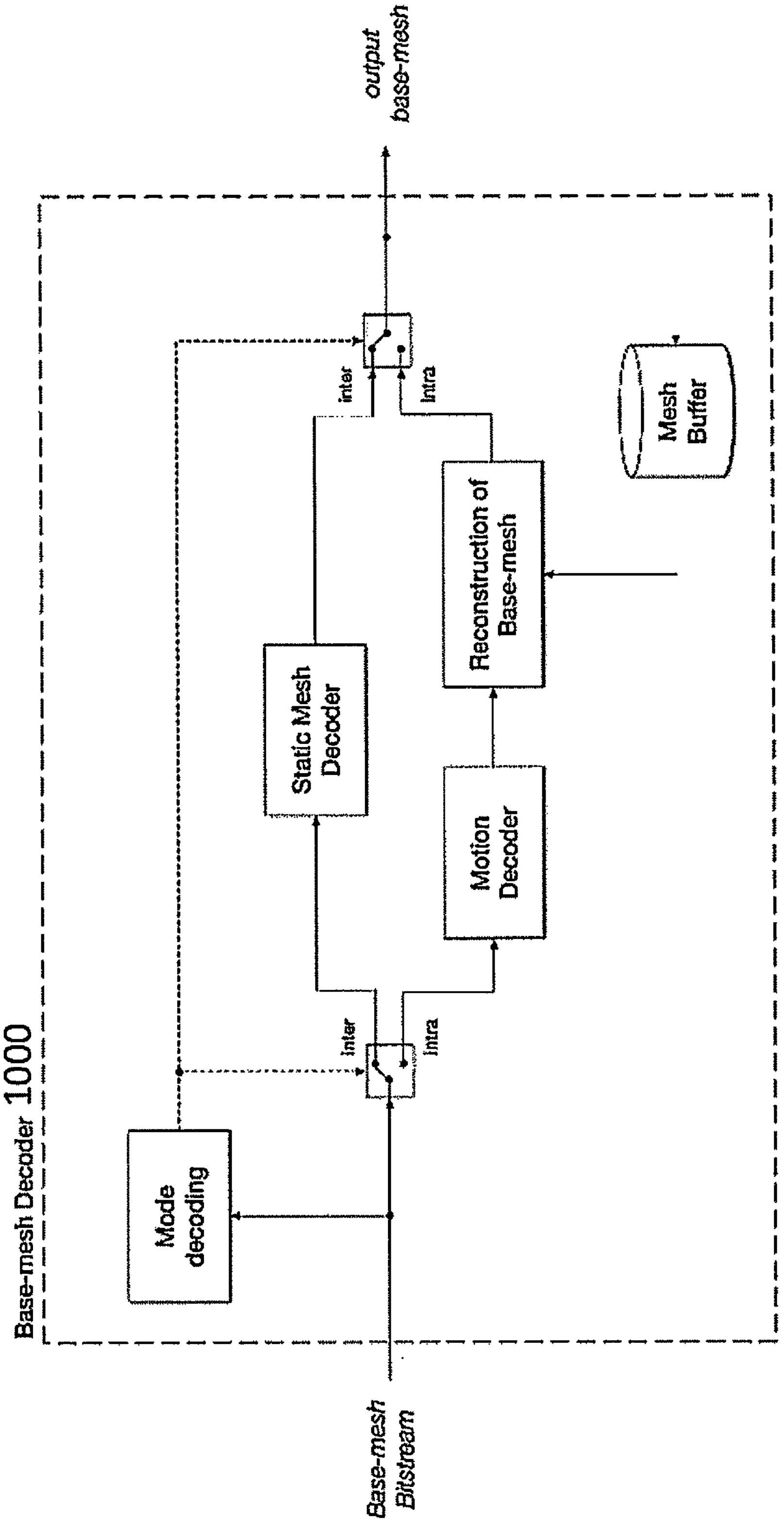
FIG. 10 shows an example base mesh decoder.

ISO/IEC 23090-5: Visual Volumetric Video-based Coding (V3C) includes a base mesh substream and codec. FIG. 8 shows a base mesh encoder (802) in the VDMC encoder 800. FIG. 9 shows a base mesh encoder 900. FIG. 10 shows a base mesh decoder 1000.

One of the key features of the current V-DMC specification design is the support for a base mesh signal that can be encoded using any currently or future specified static mesh codec. For example, such information could be coded using Draco 3D Graphics Compression or the MPEG Edgebreaker-based static mesh codec.

V-DMC introduces a new Base Mesh Substream format to allow to carry compressed frames of the base mesh. This new format is very similar to the atlas sub-bitstream of V3C, with the base mesh sub-bitstream also constructed using NAL units. High Level Syntax (HLS) structures such as base mesh sequence parameter sets, base mesh frame parameter sets, submesh layer are also specified.

Figure 11:
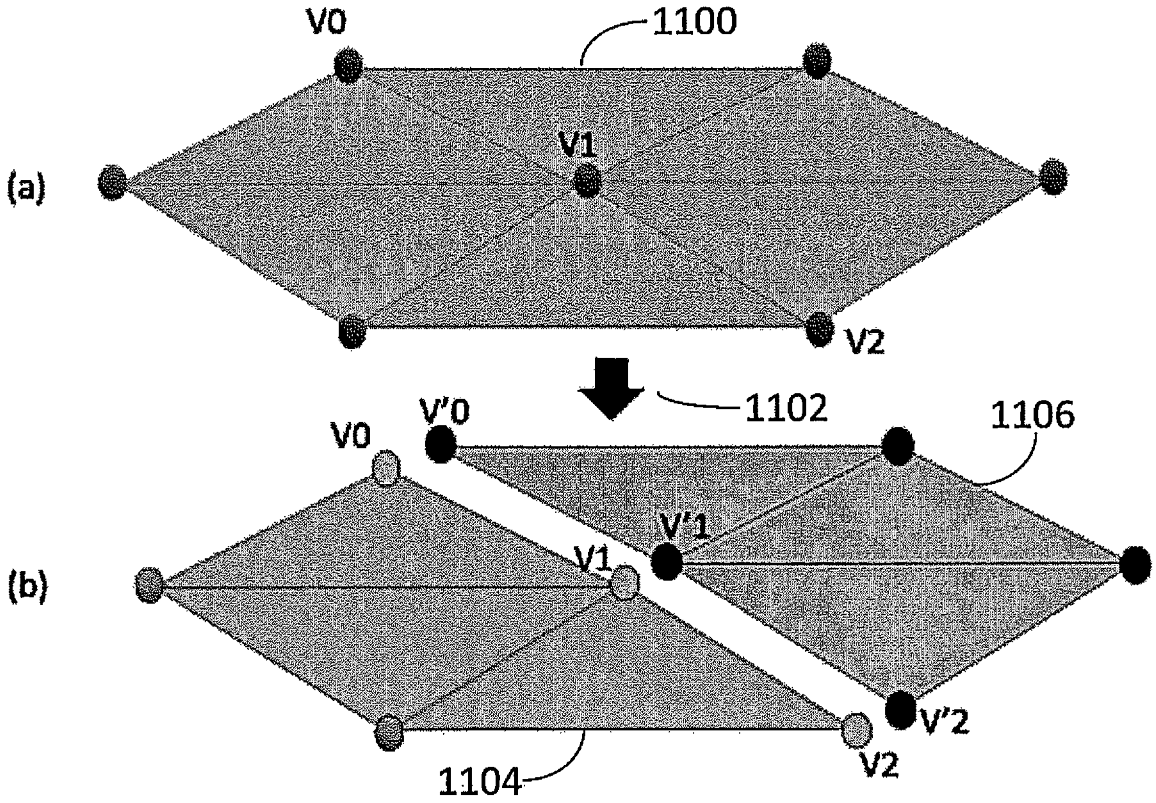
FIG. 11 depicts segmentation of a mesh into sub-meshes.

ISO/IEC 23090-5: Visual Volumetric Video-based Coding (V3C) includes submeshes. FIG. 11 shows segmentation 1102 of a mesh 1100 into sub-meshes (1104, 1106). One of the desirable features of this design is the ability to segment 1102 a mesh 1100 into multiple smaller partitions, referred to herein as submeshes (1104, 1106). These submeshes (1104, 1106) can be decoded completely independently, which can help with partial decoding and spatial random access. Although it may not be a requirement for all applications, some applications may require that the segmentation in submeshes remains consistent and fixed in time. The submeshes (1104, 1106) do not need to use the same coding type, i.e., for one frame one submesh may use intra coding while for another inter coding could be used at the same decoding instance, but it is commonly a requirement that the same coding order is used and the same references are available for all submeshes corresponding at a particular time instance. Such restrictions can help guarantee proper random access capabilities for the entire stream.

Figure 12:
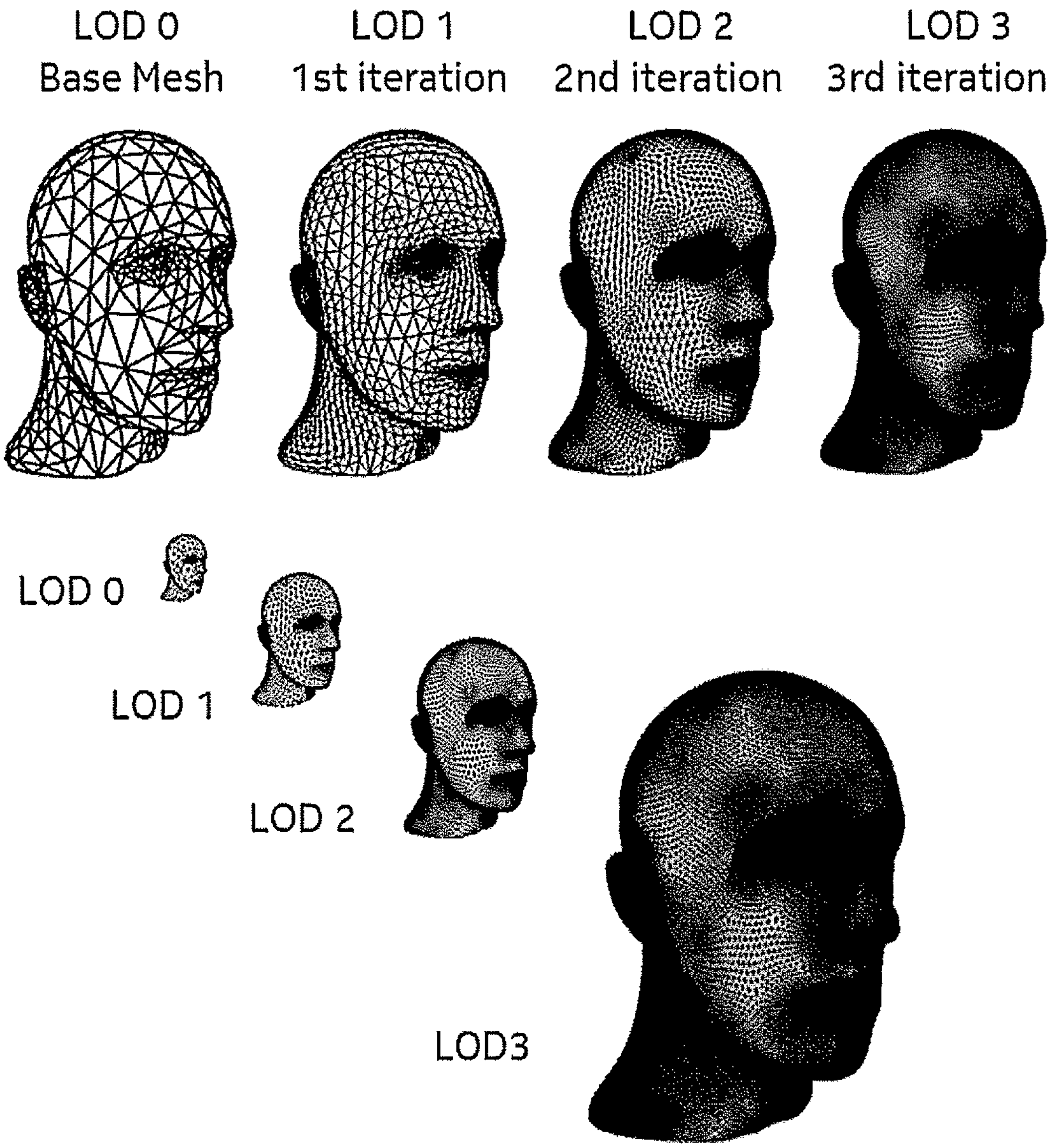
FIG. 12 shows the concept of level of detail (LOD) in V-DMC.

ISO/IEC 23090-5: Visual Volumetric Video-based Coding (V3C) includes Level-of-Detail (LoD). The V-DMC framework utilizes the well-known concept of Level-of-Detail (LoD). FIG. 12 shows the concept of Level of Detail (LOD) in V-DMC. As illustrated on FIG. 12, different LoD levels correspond to different sampling rates and qualities of meshes. It is desirable to process different LoD levels on a GPU for example for rendering, to optimize rendering speed. For example when the mesh is rendered at a far distance in the viewport, it only is represented by a small number of pixels, and a coarse mesh representation (lowest LoD level, as shown in FIG. 11, LOD 0) is sufficient as finer sampling rates of the mesh would not lead to a better quality. When the mesh is rendered at a close distance in the viewport, then it is desirable to view it in full resolution (highest LoD level, as shown in FIG. 11, LOD 3) to maximize rendering quality. In between these cases (for example, LOD 1 and LOD 2), the LoD level can be optimized based on the area of the viewport that would be occupied by the mesh, and it is therefore desirable to represent the mesh in several LoDs for interactive rendering applications. In V-DMC, typically 3 LoD levels are defined, but some rendering applications may use for example up to 18 LoD levels. A given LoD level is generated from the previous LoD reconstruction by using a subdivision iteration and applying reconstructed displacement data as explained before.

ISO/IEC 23090-5: Visual Volumetric Video-based Coding (V3C) includes the concept of displacement video frame packing.

Figure 13:
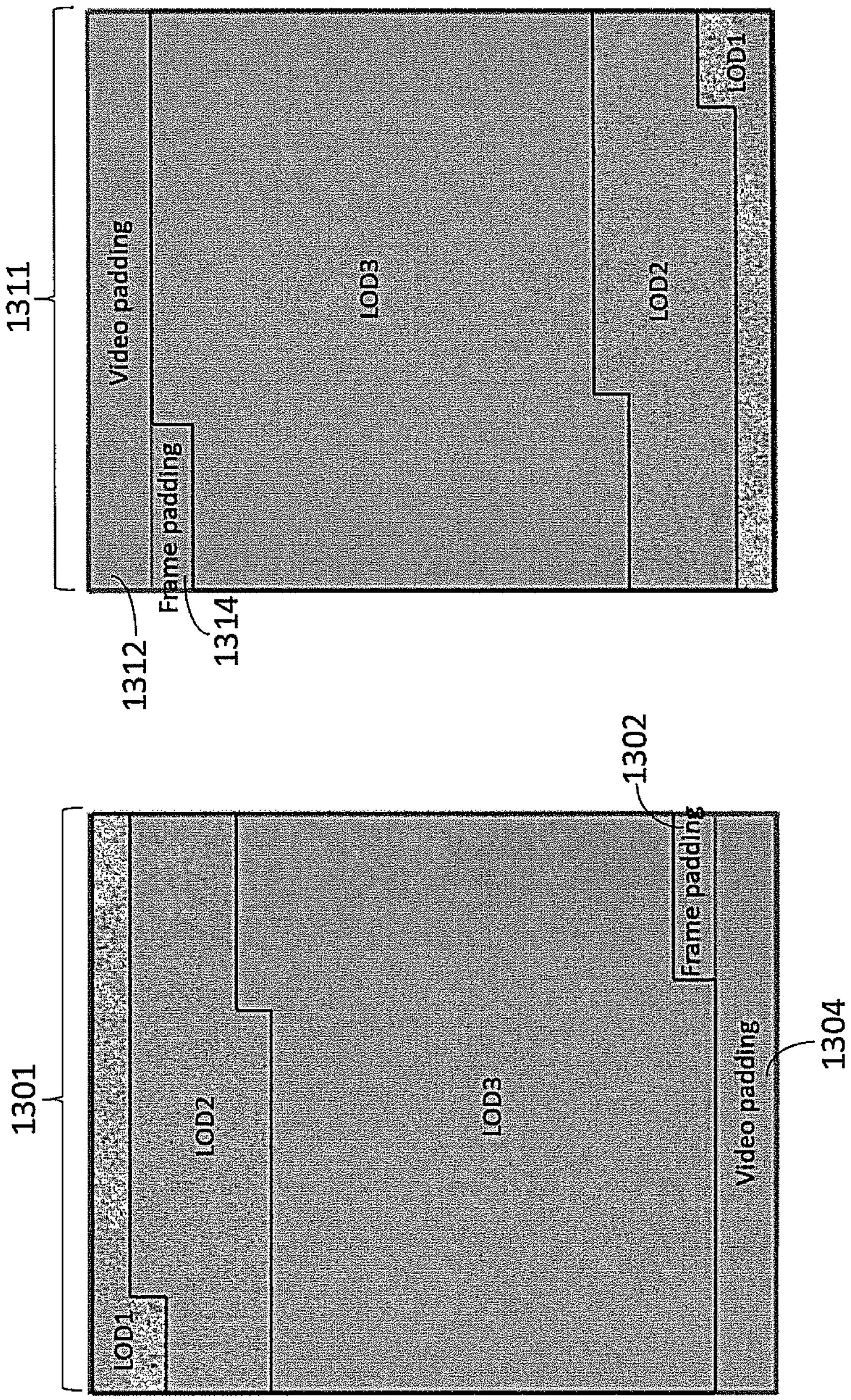
FIG. 13 shows example displacement packing strategies.

The video-based packing of displacement is illustrated on FIG. 13 and is performed LOD level by LOD level, by concatenating displacement values in a video frame, following a LOD mesh traversal (for example the Morton order). It is possible to pack first the displacement data corresponding to the lowest (coarsest) LOD level (for example LOD1), following by the next LOD levels (for example LOD2 and LOD3) in consecutive and increasing order, and to pad (1302, 304) the video frame 1301 in order to make sure the video frame 1301 has the same width and height over a group of frames. Another approach consists in packing first the padding (1312, 1314) in video frame 1311, then the highest LOD level (LOD3) down to the coarsest LOD level (LOD1). Due to the nature of the displacement data that is sparser in the highest LOD levels, this may lead to a better encoding due to the context updates of the video codec CABAC encoder. It can be seen that in both cases (the case related to video frame 1301 and the case related to video frame 1311), the displacements corresponding to the same LOD are grouped in non-rectangular slices.

Thus, FIG. 13 shows displacement packing strategies, on the left from coarsest (LOD1) to highest (LOD3) LOD level and on the right, from highest (LOD3) down to coarsest LOD level (LOD1). Notice the padding (1302, 1304) is done at the bottom of the video frame 1301 for increasing LOD level packing, and the padding (1312, 1314) is done at the start for decreasing LOD level packing.

The approaches illustrated on FIG. 13 do not lead to rectangular LODs video regions that are easily accessible in random access by a decoder. Furthermore, in many use cases, it is frequently the case that LODs are consumed from the coarsest level up to the desired LOD level, while superior levels are then dropped. For example, if the desired LOD level for rendering a mesh is level 2, then the application should decode LOD levels 1 and 2, while the data related to level 3 should not be decoded, generated, processed or rendered in an optimal pipeline. If follows that decreasing LOD level packing, while showing compression gains compared to increasing LOD level packing, does not meet an essential aspect of optimal mesh processing and rendering pipelines, because the decoder cannot easily access the required LODs and needs to parse the frame until the LOD2.

The problem consists in packing displacement data in a video frame in such a way that LODs can be easily extracted from coarse to higher LOD with spatial random access and to allow for in bitstream rate adaption by simply dropping the highest LODs when needed, while achieving good compression performance.

As shown on FIG. 13 the V-DMC encoder packs displacement data for each LOD one after another (alternatively in a raster scan order). The decoder is able to determine the position of each LOD while/after decoding/extracting the previous LOD.

The V-DMC high level syntax (HLS) does not provide possibility to pack LOD displacements in such a way that it can be utilized on the system level during smart delivery over unreliable/limited transmission channel.

Described herein are examples, including methods and machines, to enable packing of displacement data of V-DMC in rectangular regions of the video frame. The regions can, for example, correspond to tiles as defined in HEVC and VVC, or subpictures as defined in VVC. The position of the regions and its mapping to LODs would be signaled in V-DMC bitstream, allowing an apparatus to perform inverse reconstruction of a mesh based on the selected LOD.

Described herein is an apparatus/method/computing program comprising: receiving mesh data, determine subdivision count (number of LODs) for a given mesh data and calculate the displacement values for each subdivision iteration (LOD), pack the displacement values for each subdivision in a rectangular or square region of a video frame, and signal in or along a V-DMC bitstream mapping information indicating the relation between displacement LODs and the regions of the video frame.

The main purpose of packing in rectangular regions is to be able to encode later on with a video codec which allows to independently decode the regions (e.g. subbitstreams in VVC).

Described herein is an apparatus/method/computing program comprising: receiving a V-DMC bitstream, extracting from the bitstream the number of LODs and the mapping information indicating the relation between displacement LODs and the video frame regions, receiving desired maximum LOD information from a rendering module, extracting and decoding only the displacement values as indicated by the mapping information from the video substream corresponding to the LOD levels that are below or equal to the desired maximum LOD level to be decoded, and reconstructing the desired LOD of the mesh data using extracted and decoded displacement values.

In an embodiment, the video frame to be encoded (including displacement data for different LOD-levels) may be prepared such that the resolution of the packed video frame is less than or equal to a maximum resolution allowed by a certain profile-tier-level (PTL) of the target video decoder. The target decoder may be based on the devices for which the application or the content provider chooses to enable V-DMC based use-cases.

In an alternate embodiment, the video frame to be encoded (including displacement data for different LOD-levels) may be prepared such that the packed video frame does not contain any regions with empty data (or data not used for rendering) or contain regions with empty data (or data not used for rendering) which is below a threshold. The threshold may be chosen based on the bitrate overhead resulting from including empty data (or data not used for rendering), or the threshold may be manually set by the system user. Determination of the threshold may not need to be fully automated by such a calculation of bitrate overhead.

In an embodiment, the region with empty data may be filled with substitutable subpictures or slices or tiles with for example black pixels or gray pixels. The pixels may be of a different color other than gray or black, where the color of the pixels of the subpictures or slices or tiles used for the empty data is a configurable option, as long as there is an indication that the subpictures or slices or tiles used for the empty data are not part of the packed regions for displacement information. The indication that the subpictures or slices or tiles used for the empty data are not part of the packed regions for displacement information may be implicit, based on for example the color of the pixels of the subpictures or slices or tiles used for the empty data. For example, when the color of the pixels of the subpictures or slices or tiles used for the empty data is gray or black, this may be an implicit indication to a decoder that the subpictures or slices or tiles used for the empty data do not have displacement information.

In one embodiment, the subdivision count is determined based on input parameters to the encoder.

In one embodiment, the displacement data is sorted by LOD-level and following a vertex traversal order as defined in the VDMC framework, such as the Morton order for example.

In one embodiment the video frame can contain multiple sub streams of V-DMC data, e.g., texture information and displacement information. In another embodiment the video frame can only contain displacement values.

In one embodiment displacement data for each LOD is mapped to a separate region that is aligned to CTU boundaries.

In another embodiment, these regions are defined as slices of HEVC.

In one embodiment, these regions are rectangular or square and correspond to Tiles.

In one embodiment the Tiles are defined as Motion-Constrained Tile Sets (MCTS) such that motion compensation is constrained to refer to the same tile location in reconstructed reference frames.

In one embodiment, these regions are defined as VVC subpictures.

In one embodiment, the signaling information in a bitstream allowing the client to determine the relations between region of video frame and LOD and allows extract the displacement values of each LOD is provided in ASPS.

| | Descriptor |
|---|---|
| asps_vdmc_extension( ) { | |
| asps_vdmc_ext_subdivision_method | u(3) |
| if(asps_vdmc_ext_subdivision_method != 0) { | |
| asps_vdmc_ext_subdivision_iteration_count | u(8) |
| } | |
| asps_vdmc_ext_displacement_coordinate_system | u(1) |
| asps_vdmc_ext_transform_method | u(3) |
| if(asps_vdmc_ext_transform_method == LINEAR_LIFTING) { | |
| vdmc_lifting_transform_parameters( 0, 0 ) | |
| } | |
| asps_vdmc_ext_num_attribute_video | u(7) |
| for(i=0; i< asps_vdmc_ext_num_attribute_video; i++){ | |
| asps_vdmc_ext_attribute_type_id [ i ] | u(8) |
| asps_vdmc_ext_attribute_frame_width[ i ] | ue(v) |

-continued

| | Descriptor |
|---|---|
| asps_vdmc_ext_attribute_frame_height[ i ] | ue(v) |
| asps_vdmc_ext_attribute_transform_method[ i ] | u(3) |
| if(asps_vdmc_ext_attribute_transform_method == LINEAR_LIFTING ) { | |
| vdmc_lifting_transform_parameters(i+1, 0) | |
| } | |
| asps_vdmc_ext_packing_method | u(2) |
| asps_vdmc_ext_1d_displacement_flag | u(1) |
| if( asps_vdmc_ext_packing_method == 2) { | |
| displacement_region_information( ) | |
| } | |
| asps_vdmc_ext_projection_textcoord_enable_flag | u(1) |
| if( asps_vdmc_ext_projection_textcoord_enable_flag ){ | |
| asps_vdmc_ext_projection_textcoord_mapping_method | u(2) |
| asps_vdmc_ext_projection_textcoord_scale_factor | fl(64) |
| } | |
| } | |

asps_vdmc_ext_packing_method equal to 0 specifies that the displacement component samples are packed in ascending order, asps_vdmc_ext_packing_method equal to 1 specifies that the displacement component samples are packed in descending order. asps_vdmc_ext_packing_method equal to 2 specifies that displacement component are packed in regions described in displacement_region_information( ) syntax element.

| | Descriptor |
|---|---|
| displacement_region_information( ) { | |
| for( i = 0; i < asps_vdmc_ext_subdivision_iteration_count; i++) | |
| dri_region_id[i] | u(16) |
| dri_region_top_left_x[ i ] | u(16) |
| dri_region_top_left_y[ i ] | u(16) |
| dri_region_width_minus1[ i ] | u(16) |
| dri_region_height_minus1[ i ] | u(16) |
| } | |
| } | |

dri_region_id[i] Specifies the Region Id for LOD with Index i.

dri_region_u[i] specifies the horizontal position of the top left sample of the region, that contains displacement values for the LOD with index i, in unit of luma samples in the displacement video component frame.

dri_region_v[i] specifies the vertical position of top left sample of the region, that contains displacement values for the LOD with index i, in unit of luma samples in the displacement video component frame.

dri_region_width[i] plus 1 specifies the width of the region, that contains displacement values for the LOD with index i, in unit of luma samples in the displacement video component frame.

dri_region_height[i] plus 1 specifies the height of the region, that contains displacement values for the LOD with index i, in unit of luma samples in the displacement video component frame.

In one embodiment displacement_region_information( ) syntax structure contains explicit syntax element that maps index i to LOD.

In one embodiment displacement_region_information( ) syntax can be placed in VPS, AFPS, or any other signalling information that is sent in or along V-DMC bitstream.

Figure 14:
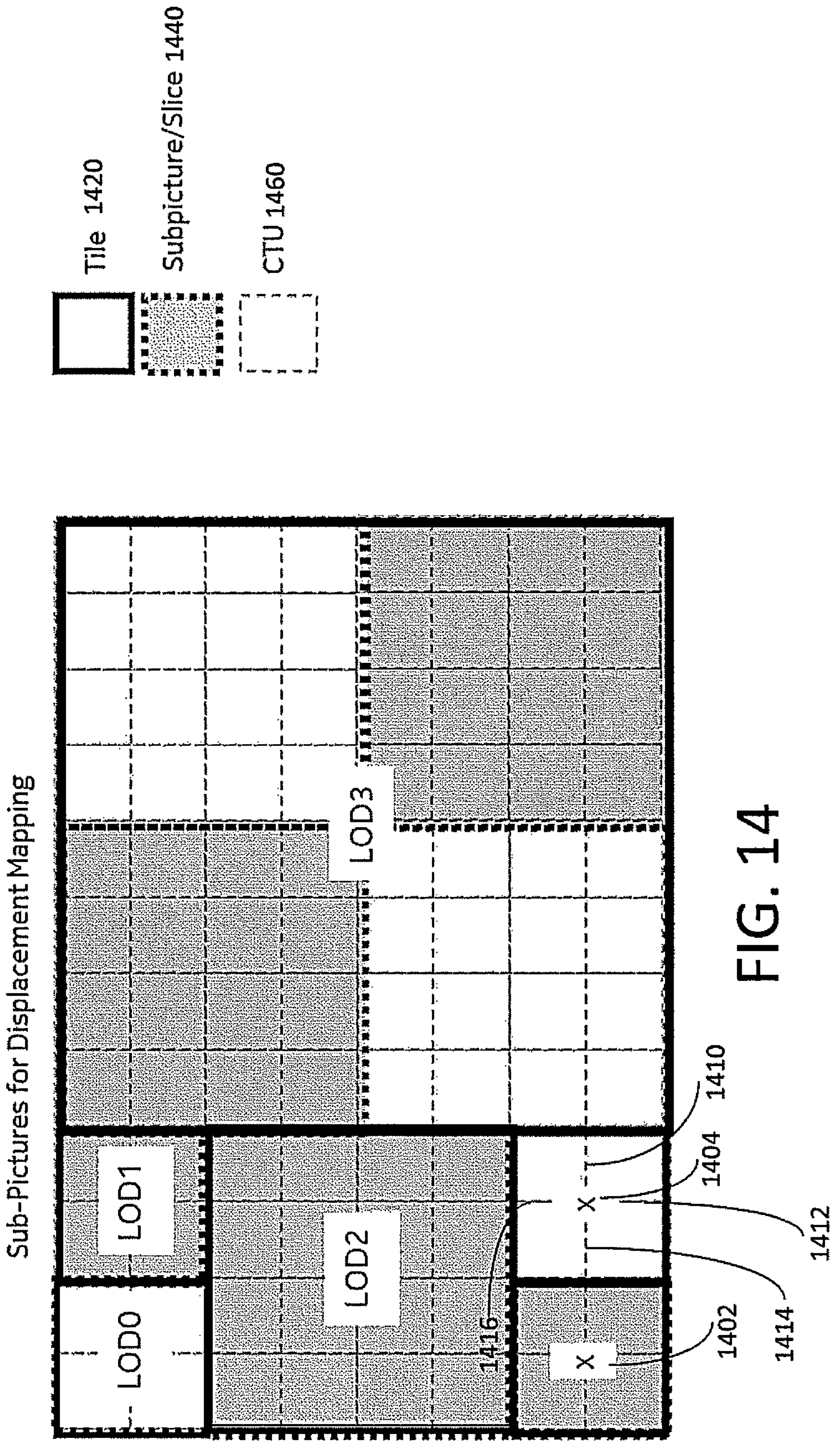
FIG. 14 shows an example of packing displacement from coarsest LOD0 to highest LOD3 level.
Figure 15:
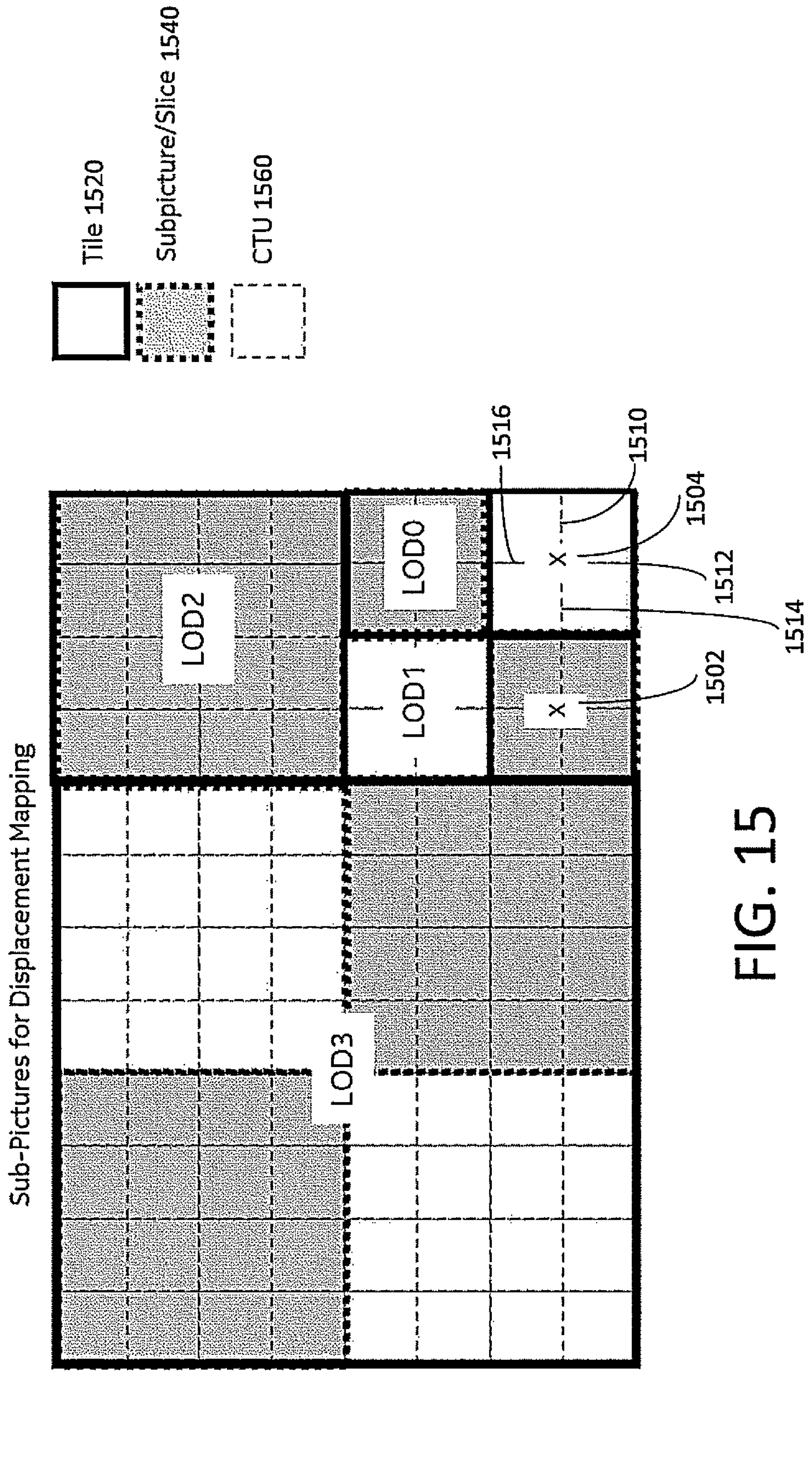
FIG. 15 shows an example of packing displacement from highest LOD3 to coarsest LOD0 levels.

In one embodiment (example), the packing of displacements into a video frame is performed as illustrated on FIG. 14 and FIG. 15. Displacement data is aligned following CTU boundaries (for example boundaries 1410, 1412, 1414, 1416, 1510, 1512, 1514, 1516). The mapping of the displacement LOD data to sub-pictures is provided by syntax elements that are transmitted in or along the bitstream. Thus, FIG. 14 shows an example of packing displacement from coarsest LOD0 to highest LOD3 level, and FIG. 15 shows an example of packing displacement from highest LOD3 to coarsest LOD0 levels. FIG. 14 shows tiles 1420 with a solid border, subpictures or slices (1440) having a dotted border, and CTUs (1460) having a dashed border. FIG. 15 shows tiles 1520 with a solid border, subpictures or slices (1540) having a dotted border, and CTUs (1560) having a dashed border.

In one embodiment, inside each region, padding data is required to fill all pixels. This padding data may be inferred by the V-DMC decoder based on the number of vertices of the corresponding LOD.

In one embodiment, it may be an advantage for faster processing and decoding to explicitly signal per frame and the length of the used padding for each LoD region in displacement_region_information( ) syntax structure.

When the video codec used is VVC, each subpicture is encoded as a VVC subpicture (independently decodable). In case the number and size of tiles or subpictures do not fill the full frame area, additional auxiliary tiles or subpictures may be added (called the Substitute subpictures (1402, 1404, 1502, 1504)) as illustrated on FIG. 14 with an “x” and on FIG. 15 with an “x”

When the video codec used is HEVC, each region is encoded as a motion-constraint tile sets (MCTS) that prevents motion compensation to refer to reference picture areas that are not within the same region.

In case multiple submeshes are enabled by the encoder, it is an advantage to be able to filter submeshes and their respective LODs adaptively. In this case, tiles or subpictures are defined per submesh and per LOD as well. In the asps, the displacement_region_information( ) is signaled for each submesh id.

In one embodiment, the lifting transform parameters are constrained to using skipUpdate=true, so that no displacement value drift appears on lower LODs in case higher LOD(s) are not decoded or not processed. In one embodiment the signaling of mapping information can be done using file format level functionality. A dedicated box syntax structure may be added to indicate the relation of various displacement LODs and the regions of the video frames.

In one embodiment the signaling of mapping information can be done using the supplemental-enhancement-information (SEI) of the video.

Attributes and displacements may be encoded in separate substreams with their own subpictures or packed together (the video frames contain both displacement and attribute pixels) with corresponding subpictures. Accordingly, the examples described herein are not limited to displacement (video) data, as they also relate to attribute (video) data. Optionally the attribute video data may be encoded/decoded using subpictures following an LOD structure into respective attribute video substreams. Optionally the attribute video data and the displacement video data may be packed into the same video frames and subpicture frames (thus frames containing displacement and attribute pixels).

In an embodiment, asve_lod_patches_enable_flag equal to 1 specifies that patches contains data per LoD. asve_lod_patches_enable_flag equal to 0 specifies that a patch contains data of all lods.

In an embodiment, mdu_lod_idx[tileID][patchIdx] indicates the LOD index for which data in the current patch with index patchIdx, in the current atlas tile with tile ID equal to tileID applies to. When mdu_lod_idx[tileID][patchIdx] is not present, its value is inferred to be equal to 0.

In an embodiment, LoD extraction information SEI payload syntax is defined as follows:

| | Descriptor |
|---|---|
| LoD_extraction_information( payloadSize ) { | |
| lei_extractable_unit_type_idx | u(2) |
| lei_number_of_submesh_minus1 | u(6) |
| for( i = 0; i < lei_number_of_submesh_minus1 + 1; i++ ) { | |
| lei_submesh_id[ i ] | ue(v) |
| lei_subdivision_iteration_count[ i ] | u(3) |
| for( j = 0; j < lei_subdivision_iteration_count + 1; j++ ) { | |
| if( lei_extractable_unit_type_idx == 0 ) | |
| lei_mcts_idx[ i ][ j ] | ue(v) |
| if( lei_extractable_unit_type_idx == 1 ) | |
| lei_subpic_idx[ i ][ j ] | ue(v) |
| } | |
| } | |
| } | |

The LoD extraction information SEI message semantics (such as that signaled with the LoD extraction information SEI payload syntax element above) includes the following:

lei_extractable_unit_type_idx indicates the type of extractable units within the video bitstream. lei_extractable_unit_type_idx equal to 0 specifies that the displacement video is encoded with MCTS (Motion-Constrained Tile Sets), as specified in ISO/IEC 23008-2. lei_extractable_unit_type_idx equal to 1 specifies that the displacement video is encoded with subpicture, as specified in ISO/IEC 23090-3.

lei_number_of_submesh_minus1 plus 1 indicates the number of submeshes.

lei_submesh_id[i] indicates the submesh ID of the i-th submesh.

lei_subdivision_iteration_count[i][j] indicates the number of iterations used for the subdivision of the i-th submesh.

lei_mcts_idx[i][j] indicates the identifier of the MCTS, corresponding to the region where the j-th refinement level displacement data of the i-th submesh in the video bitstream. lei_mcts_idx[i][j] shall be the same as idx_of_mcts_in_set[m][n][1] in ISO/IEC 23008-2: Annex D.3.43. idx_of_mcts_in_set[m][n][1] specifies the MCTS index of the 1-th MCTS in the n-th MCTS set that is associated with the m-th extraction information set.

lei_subpicture_idx[i][j] indicates the identifier of the subpicture, corresponding to the region where the j-th refinement level displacement data of the i-th submesh in the video bitstream.

This examples described herein are applicable to ISO/IEC 23090-29, V-DMC, and V-DMC scalability. As such, these embodiments described herein may be included in the ISO/IEC 23090-29 standard, including the herein described stream flow.

Figure 16:
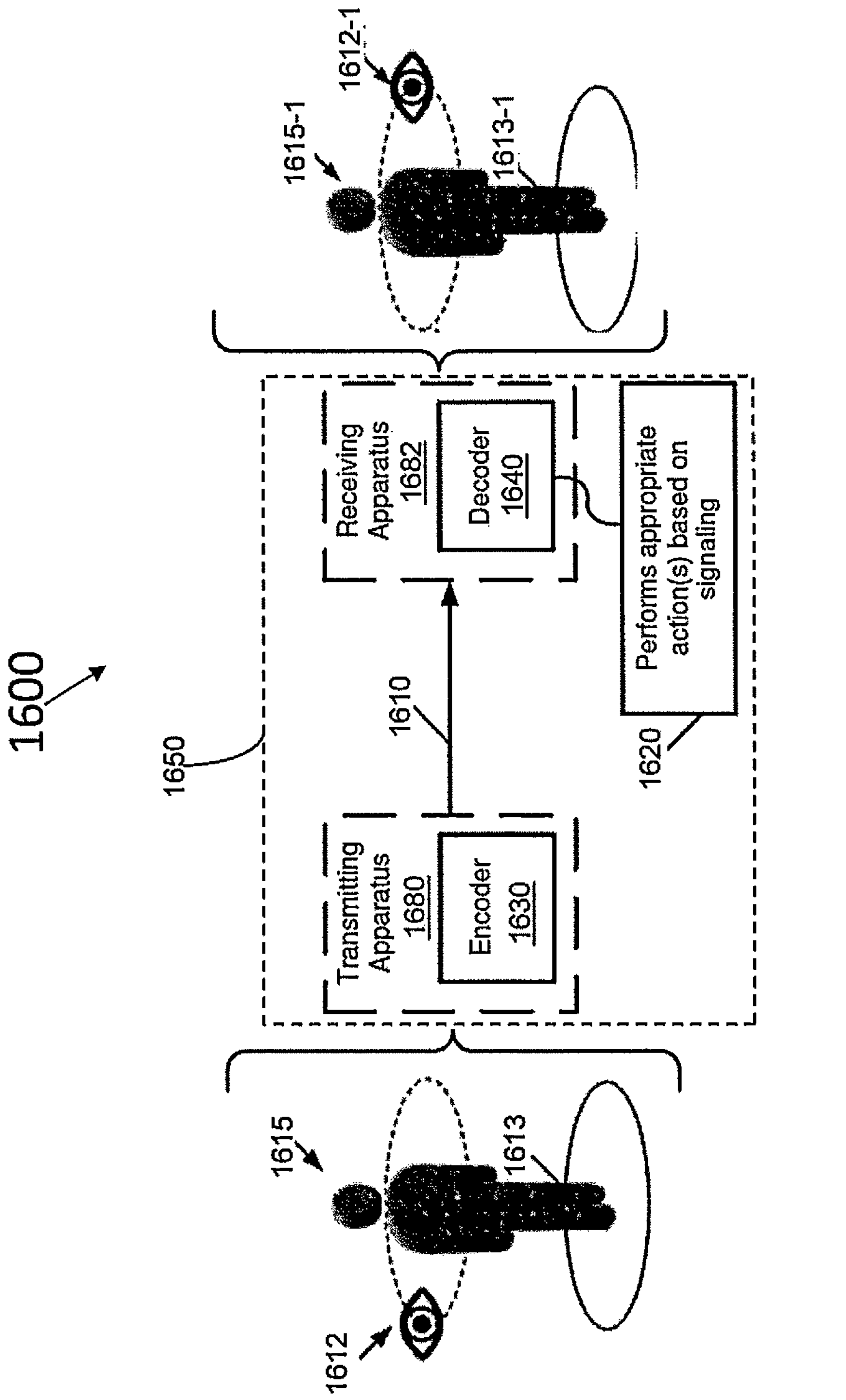
FIG. 16 is a block diagram illustrating a system in accordance with an example.

FIG. 16 is a block diagram illustrating a system 1600 in accordance with an example. In the example, the encoder 1630 is used to encode video from the scene 1615, and the encoder 1630 is implemented in a transmitting apparatus 1680. The encoder 1630 produces a bitstream 1610 comprising signaling that is received by the receiving apparatus 1682, which implements a decoder 1640. The encoder 1630 sends the bitstream 1610 that comprises the herein described signaling. The decoder 1640 forms the video for the scene 1615-1, and the receiving apparatus 1682 would present this to the user, e.g., via a smartphone, television, or projector among many other options.

In some examples, the transmitting apparatus 1680 and the receiving apparatus 1682 are at least partially within a common apparatus, and for example are located within a common housing 1650. In other examples the transmitting apparatus 1680 and the receiving apparatus 1682 are at least partially not within a common apparatus and have at least partially different housings. Therefore in some examples, the encoder 1630 and the decoder 1640 are at least partially within a common apparatus, and for example are located within a common housing 1650. For example the common apparatus comprising the encoder 1630 and decoder 1640 implements a codec. In other examples the encoder 1630 and the decoder 1640 are at least partially not within a common apparatus and have at least partially different housings, but when together still implement a codec.

3D media from the capture (e.g., volumetric capture) at a viewpoint 1612 of the scene 1615, which includes a person 1613) is converted via projection to a series of 2D representations with occupancy, geometry, and attributes. Additional atlas information is also included in the bitstream to enable inverse reconstruction. For decoding, the received bitstream 1610 is separated into its components with atlas information; occupancy, geometry, and attribute 2D representations. A 3D reconstruction is performed to reconstruct the scene 1615-1 created looking at the viewpoint 1612-1 with a "reconstructed" person 1613-1. The "-1" are used to indicate that these are reconstructions of the original. As indicated at 1620, the decoder 1640 performs an action or actions based on the received signaling.

Figure 17:
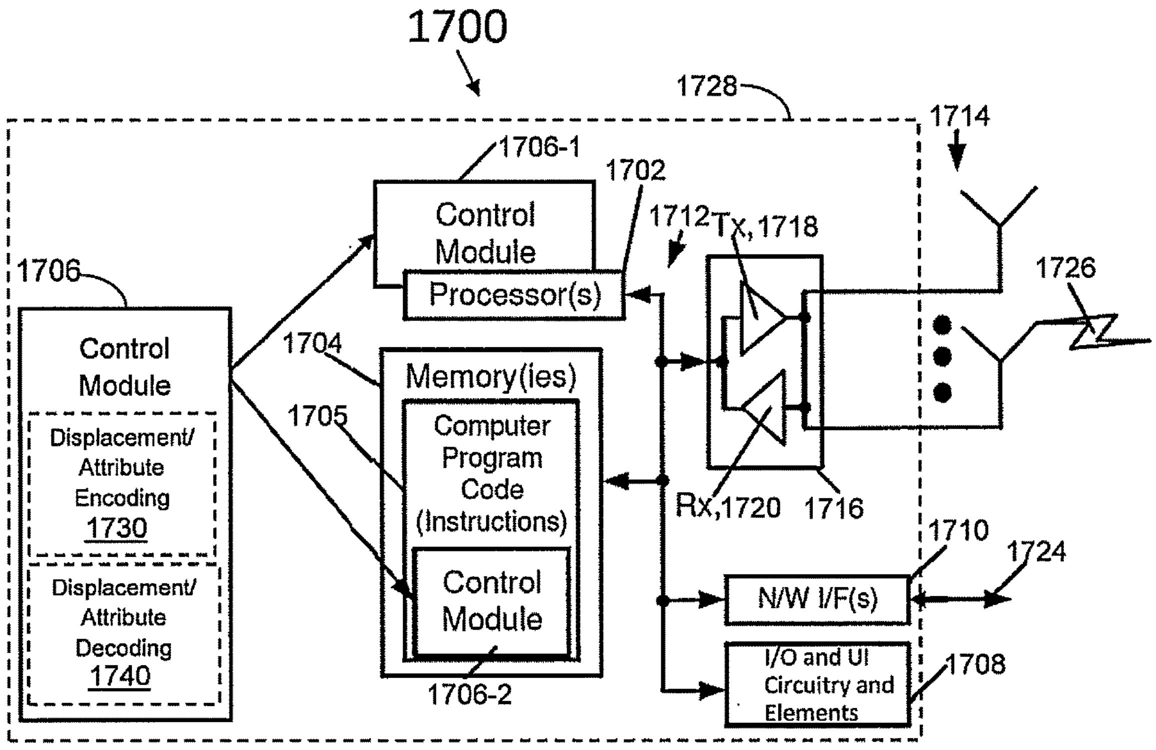
FIG. 17 is an example apparatus configured to implement the examples described herein.

FIG. 17 is an example apparatus 1700, which may be implemented in hardware, configured to implement the examples described herein. The apparatus 1700 comprises at least one processor 1702 (e.g., an FPGA and/or CPU), one or more memories 1704 including computer program code 1705, the computer program code 1705 having instructions to carry out the methods described herein, wherein the at least one memory 1704 and the computer program code 1705 are configured to, with the at least one processor 1702, cause the apparatus 1700 to implement circuitry, a process, component, module, or function (implemented with control module 1706) to implement the examples described herein, including V-DMC displacement rectangular packing. Optionally included displacement/attribute encoding 1730 of the control module 1706 implements encoding based on the examples described herein, and optionally included displacement/attribute decoding 1740 implements decoding based on the examples described herein. The memory 1704 may be a non-transitory memory, a transitory memory, a volatile memory (e.g. RAM), or a non-volatile memory (e.g., ROM).

The apparatus 1700 includes a display and/or I/O interface 1708, which includes user interface (UI) circuitry and elements, that may be used to display features or a status of the methods described herein (e.g., as one of the methods is being performed or at a subsequent time), or to receive input from a user such as with using a keypad, camera, touchscreen, touch area, microphone, biometric recognition, one or more sensors, etc. The apparatus 1700 includes one or more communication e.g. network (N/W) interfaces (I/F(s)) 1710. The communication I/F(s) 1710 may be wired and/or wireless and communicate over the Internet/other network(s) via any communication technique including via one or more links 1724. The communication I/F(s) 1710 may comprise one or more transmitters or one or more receivers.

The transceiver 1716 comprises one or more transmitters 1718 and one or more receivers 1720. The transceiver 1716 and/or communication I/F(s) 1710 may comprise standard well-known components such as an amplifier, filter, frequency-converter, (de) modulator, and encoder/decoder circuitries and one or more antennas, such as antennas 1714 used for communication over wireless link 1726.

The control module 1706 of the apparatus 1700 comprises one of or both parts 1706-1 and/or 1706-2, which may be implemented in a number of ways. The control module 1706 may be implemented in hardware as control module 1706-1, such as being implemented as part of the one or more processors 1702. The control module 1706-1 may be implemented also as an integrated circuit or through other hardware such as a programmable gate array. In another example, the control module 1706 may be implemented as control module 1706-2, which is implemented as computer program code (having corresponding instructions) 1705 and is executed by the one or more processors 1702. For instance, the one or more memories 1704 store instructions that, when executed by the one or more processors 1702, cause the apparatus 1700 to perform one or more of the operations as described herein. Furthermore, the one or more processors 1702, one or more memories 1704, and example algorithms (e.g., as flowcharts and/or signaling diagrams), encoded as instructions, programs, or code, are means for causing performance of the operations described herein.

The apparatus 1700 to implement the functionality of control 1706 may correspond to any of the apparatuses depicted herein. Alternatively, apparatus 1700 and its elements may not correspond to any of the other apparatuses depicted herein, as apparatus 1700 may be part of a self-organizing/optimizing network (SON) node or other node, such as a node in a cloud.

The apparatus 1700 may also be distributed throughout the network including within and between apparatus 1700 and any network element (such as a base station and/or terminal device and/or user equipment).

Interface 1712 enables data communication and signaling between the various items of apparatus 1700, as shown in FIG. 17. For example, the interface 1712 may be one or more buses such as address, data, or control buses, and may include any interconnection mechanism, such as a series of lines on a motherboard or integrated circuit, fiber optics or other optical communication equipment, and the like. Computer program code (e.g. instructions) 1705, including control 1706 may comprise object-oriented software configured to pass data or messages between objects within computer program code 1705. The apparatus 1700 need not comprise each of the features mentioned, or may comprise other features as well. The various components of apparatus 1700 may at least partially reside in a common housing 1728, or a subset of the various components of apparatus 1700 may at least partially be located in different housings, which different housings may include housing 1728.

Figure 18:
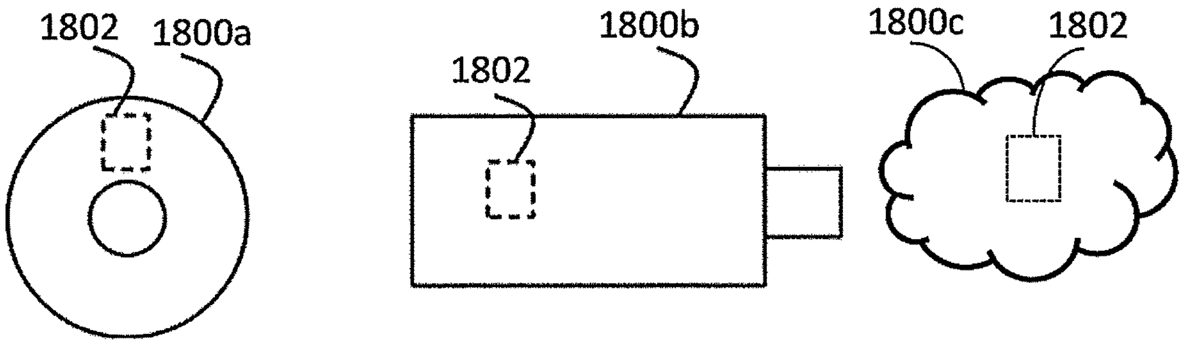
FIG. 18 shows a representation of an example of non-volatile memory media used to store instructions that implement the examples described herein.

FIG. 18 shows a schematic representation of non-volatile memory media 1800*a* (e.g. computer/compact disc (CD) or digital versatile disc (DVD)) and 1800*b* (e.g. universal serial bus (USB) memory stick) and 1800*c* (e.g. cloud storage for downloading instructions and/or parameters 1802 or receiving emailed instructions and/or parameters 1802) storing instructions and/or parameters 1802 which when executed by a processor allows the processor to perform one or more of the operations of the methods described herein. Instructions and/or parameters 1802 may represent or correspond to a non-transitory computer readable medium.

Figure 19:
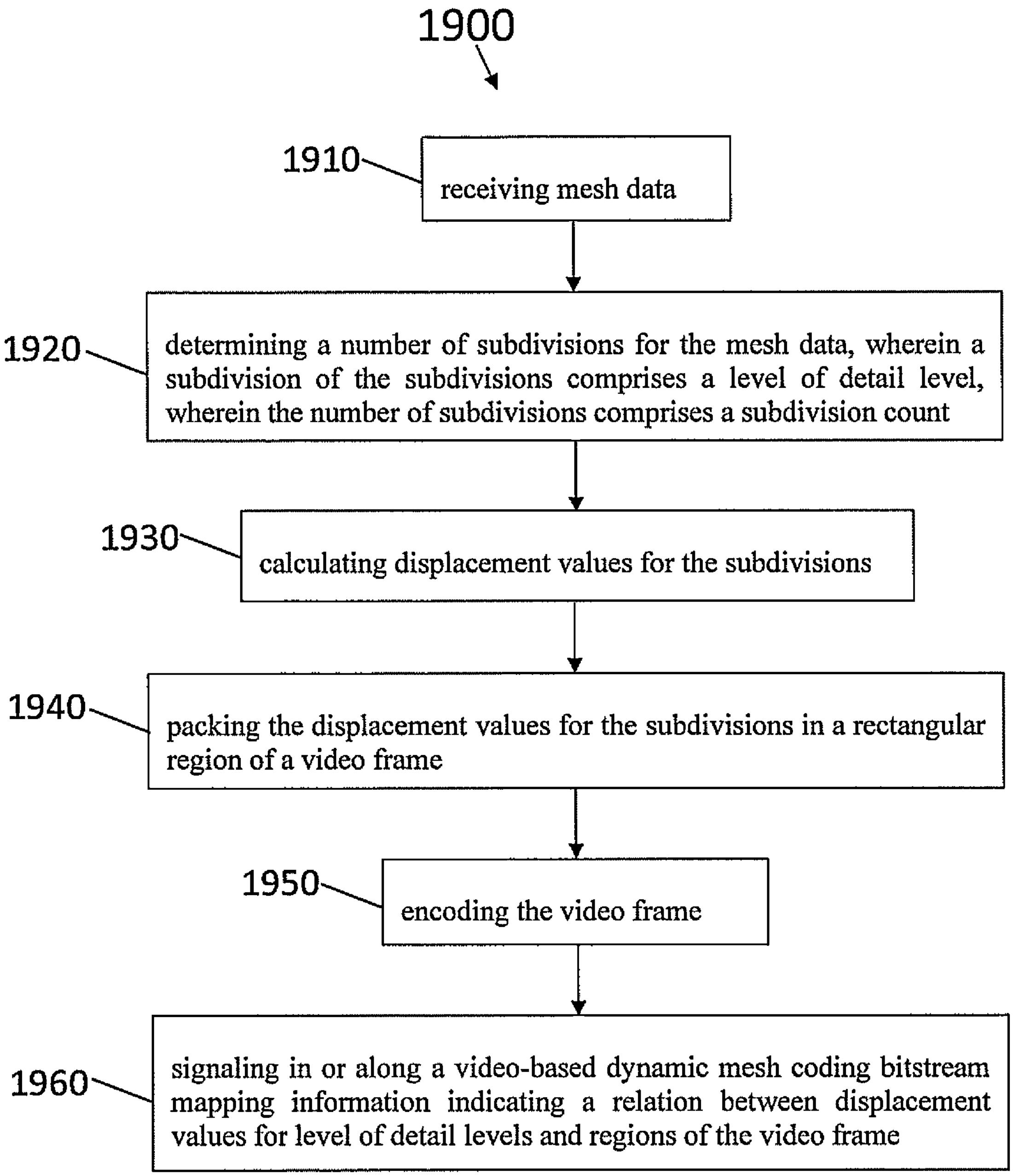
FIG. 19 is an example method, based on the examples described herein.

FIG. 19 is an example method 1900, based on the example embodiments described herein. At 1910, the method includes receiving mesh data. At 1920, the method includes determining a number of subdivisions for the mesh data, wherein a subdivision of the subdivisions comprises a level of detail level, wherein the number of subdivisions comprises a subdivision count. At 1930, the method includes calculating displacement values for the subdivisions. At 1940, the method includes packing the displacement values for the subdivisions in a rectangular region of a video frame. At 1950, the method includes encoding the video frame. At 1960, the method includes signaling in or along a video-based dynamic mesh coding bitstream mapping information indicating a relation between displacement values for level of detail levels and regions of the video frame. Method 1900 may be performed with encoder 100, apparatus 300, apparatus 400, encoder 800, encoder 900, encoder 1630, apparatus 1700, or any of the other apparatuses described herein.

Figure 20:
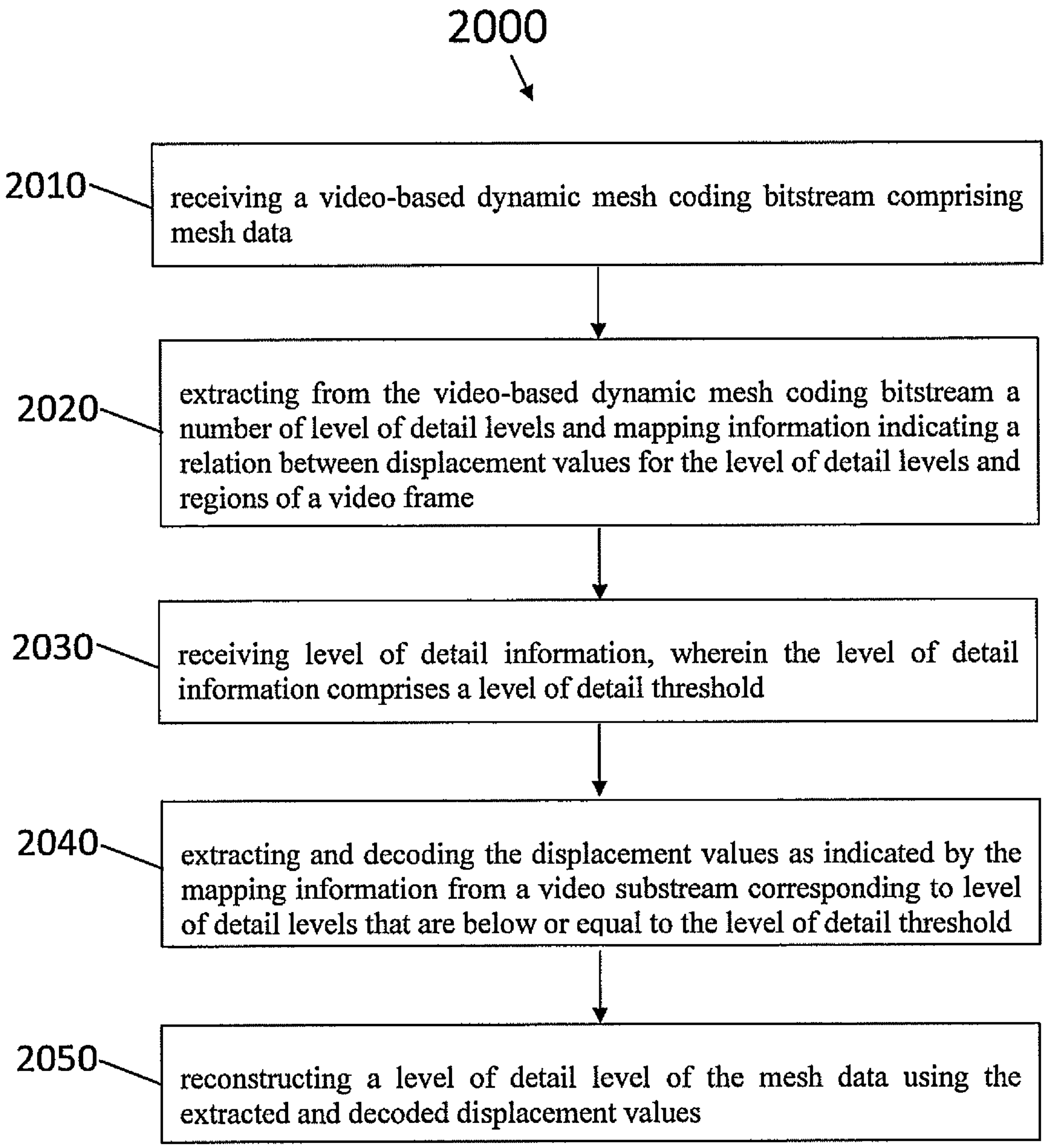
FIG. 20 is an example method, based on the examples described herein.

FIG. 20 is an example method 2000, based on the example embodiments described herein. At 2010, the method includes receiving a video-based dynamic mesh coding bitstream comprising mesh data. At 2020, the method includes extracting from the video-based dynamic mesh coding bitstream a number of level of detail levels and mapping information indicating a relation between displacement values for the level of detail levels and regions of a video frame. At 2030, the method includes receiving level of detail information, wherein the level of detail information comprises a level of detail threshold. At 2040, the method includes extracting and decoding the displacement values as indicated by the mapping information from a video substream corresponding to level of detail levels that are below or equal to the level of detail threshold. At 2050, the method includes reconstructing a level of detail level of the mesh data using the extracted and decoded displacement values. Method 2000 may be performed with apparatus 500, apparatus 600, apparatus 700, decoder 1000, decoder 1640, apparatus 1700, or any of the other apparatuses described herein.

The following examples are provided and described herein.

Example 1. An apparatus including: at least one processor; and at least one memory storing instructions that, when executed by the at least one processor, cause the apparatus at least to: receive mesh data; determine a number of subdivisions for the mesh data, wherein a subdivision of the subdivisions comprises a level of detail level, wherein the number of subdivisions comprises a subdivision count;

calculate displacement values for the subdivisions; pack the displacement values for the subdivisions in a rectangular region of a video frame; encode the video frame; and signal in or along a video-based dynamic mesh coding bitstream mapping information indicating a relation between displacement values for level of detail levels and regions of the video frame.

Example 2. The apparatus of example 1, wherein the instructions, when executed by the at least one processor, cause the apparatus at least to: configure the video frame and the displacement values for different level of detail levels such that a resolution of the video frame is less than or equal to a maximum resolution allowed by a profile tier level of a target video decoder.

Example 3. The apparatus of any of examples 1 to 2, wherein the instructions, when executed by the at least one processor, cause the apparatus at least to configure the video frame and the displacement values for different level of detail levels such that at least one or more of the following applies: the video frame does not contain any regions with empty data, or the video frame does not contain any regions with data not used for decoding, or a number of regions of the video frame with empty data is below a threshold number of empty data regions, wherein the threshold number of empty data regions is based on a bitrate overhead that results from including the empty data, or a number of regions of the video frame with data not used for decoding is below a threshold number of empty data regions not used for decoding, wherein the threshold number of empty data regions not used for decoding is based on a bitrate overhead that results from including the empty data regions not used for decoding, or wherein the threshold number of empty data regions not used for decoding is received from a system user based on a manual setting by the system user.

Example 4. The apparatus of any of examples 1 to 3, wherein the instructions, when executed by the at least one processor, cause the apparatus at least to: configure the video frame to contain at least one region with empty data; encode the at least one region with empty data with substitutable subpictures or slices or tiles; wherein the substitutable subpictures or slices or tiles are not part of packed regions of the video frame having displacement information.

Example 5. The apparatus of any of examples 1 to 4, wherein the instructions, when executed by the at least one processor, cause the apparatus at least to: determine the subdivision count based on input parameters to an encoder, wherein the apparatus comprises the encoder.

Example 6. The apparatus of any of examples 1 to 5, wherein the instructions, when executed by the at least one processor, cause the apparatus at least to: sort the displacement values by level of detail level, wherein the sorting follows a vertex traversal order.

Example 7. The apparatus of any of examples 1 to 6, wherein the video frame comprises multiple sub-streams of video-based dynamic mesh coding data, wherein one sub-stream of the multiple sub-streams comprises texture information, and another sub-stream of the multiple sub-streams comprises displacement information.

Example 8. The apparatus of any of examples 1 to 7, wherein displacement data for a level of detail level is mapped to a separate region that is aligned to boundaries of a coding tree unit.

Example 9. The apparatus of example 8, wherein at least one or more of the following applies to the separate region: the separate region comprises a high efficiency video coding slice, or the separate region comprises a rectangular tile, or the separate region comprises a rectangular tile, and the tile comprises a motion constrained tile set such that motion compensation is constrained to refer to a same tile location in reconstructed reference frames, or the separate region comprises a versatile video coding subpicture.

Example 10. The apparatus of any of examples 1 to 9, wherein the mapping information indicating the relation between displacement values for level of detail levels and regions of the video frame signaled in or along the video-based dynamic mesh coding bitstream is provided in an atlas bitstream or an atlas sequence parameter set.

Example 11. The apparatus of any of examples 1 to 10, wherein the instructions, when executed by the at least one processor, cause the apparatus at least to: encode the rectangular region of the video frame as one or more video substreams, wherein a video substream of the one or more video substreams comprises a profile, tier, or level of detail level.

Example 12. The apparatus of any of examples 1 to 11, wherein the instructions, when executed by the at least one processor, cause the apparatus at least to: determine attribute video data for the subdivisions; and pack the attribute video data for the subdivisions in a rectangular region of a video frame.

Example 13. The apparatus of any of examples 1 to 12, wherein the instructions, when executed by the at least one processor, cause the apparatus at least to: encode attribute video data using subpictures into respective attribute video substreams, based on the subdivisions.

Example 14. The apparatus of any of examples 1 to 13, wherein the instructions, when executed by the at least one processor, cause the apparatus at least to: encode displacement video data using subpictures into respective displacement video substreams, based on the subdivisions.

Example 15. The apparatus of any of examples 1 to 14, wherein the instructions, when executed by the at least one processor, cause the apparatus at least to: pack attribute video data and displacement video data into the same video frames and subpicture frames, wherein the video frames and subpicture frame comprise displacement pixels and attribute pixels.

Example 16. An apparatus including: at least one processor; and at least one memory storing instructions that, when executed by the at least one processor, cause the apparatus at least to: receive a video-based dynamic mesh coding bitstream comprising mesh data; extract from the video-based dynamic mesh coding bitstream a number of level of detail levels and mapping information indicating a relation between displacement values for the level of detail levels and regions of a video frame; receive level of detail information, wherein the level of detail information comprises a level of detail threshold; extract and decode the displacement values as indicated by the mapping information from a video substream corresponding to level of detail levels that are below or equal to the level of detail threshold; and reconstruct a level of detail level of the mesh data using the extracted and decoded displacement values.

Example 17. The apparatus of example 16, wherein the video frame and the displacement values for different level of detail levels are configured such that a resolution of the video frame is less than or equal to a maximum resolution allowed by a profile tier level of the apparatus, wherein the apparatus comprises a target video decoder.

Example 18. The apparatus of any of examples 16 to 17, wherein the video frame and the displacement values for different level of detail levels are configured such that at least one or more of the following applies: the video frame does not contain any regions with empty data, or the video frame does not contain any regions with data not used for decoding, or a number of regions of the video frame with empty data is below a threshold number of empty data regions, wherein the threshold number of empty data regions is based on a bitrate overhead that results from including the empty data, or a number of regions of the video frame with data not used for decoding is below a threshold number of empty data regions not used for decoding, wherein the threshold number of empty data regions not used for decoding is based on a bitrate overhead that results from including the empty data regions not used for decoding, or wherein the threshold number of empty data regions not used for decoding is based on a manual setting by a system user.

Example 19. The apparatus of any of examples 16 to 18, wherein the instructions, when executed by the at least one processor, cause the apparatus at least to: decode substitutable subpictures or slices or tiles from at least one region of the video frame with empty data; wherein the substitutable subpictures or slices or tiles are not part of packed regions of the video frame having displacement information.

Example 20. The apparatus of any of examples 16 to 19, wherein the number of level of detail levels comprises a subdivision count, wherein the subdivision count is based on input parameters to an encoder from which the video-based dynamic mesh coding bitstream is received.

Example 21. The apparatus of any of examples 16 to 20, wherein the displacement values are sorted by level of detail level, wherein the sorting follows a vertex traversal order.

Example 22. The apparatus of any of examples 16 to 21, wherein the video frame comprises multiple sub-streams of video-based dynamic mesh coding data, wherein one sub-stream of the multiple sub-streams comprises texture information, and another sub-stream of the multiple sub-streams comprises displacement information.

Example 23. The apparatus of any of examples 16 to 22, wherein displacement data for a level of detail level is mapped to a separate region that is aligned to boundaries of a coding tree unit.

Example 24. The apparatus of example 23, wherein at least one or more of the following applies to the separate region: the separate region comprises a high efficiency video coding slice, or the separate region comprises a rectangular tile, or the separate region comprises a rectangular tile, and the tile comprises a motion constrained tile set such that motion compensation is constrained to refer to a same tile location in reconstructed reference frames, or the separate region comprises a versatile video coding subpicture.

Example 25. The apparatus of any of examples 16 to 24, wherein the mapping information indicating the relation between displacement values for the level of detail levels and regions of the video frame extracted from the video-based dynamic mesh coding bitstream is provided in an atlas bitstream or an atlas sequence parameter set.

Example 26. The apparatus of any of examples 16 to 25, wherein the level of detail information is received from a rendering engine or other application entity.

Example 27. The apparatus of any of examples 16 to 26, wherein the instructions, when executed by the at least one processor, cause the apparatus at least to: decode attribute video data from the video-based dynamic mesh coding bitstream; and reconstruct a level of detail level of the mesh data using the decoded attribute video data.

Example 28. The apparatus of any of examples 16 to 27, wherein the instructions, when executed by the at least one processor, cause the apparatus at least to: decode attribute video data from subpictures from respective attribute video substreams, based on the level of detail levels.

Example 29. The apparatus of any of examples 16 to 28, wherein the instructions, when executed by the at least one processor, cause the apparatus at least to: decode displacement video data from subpictures from respective displacement video substreams, based on the level of detail levels.

Example 30. The apparatus of any of examples 16 to 29, wherein the instructions, when executed by the at least one processor, cause the apparatus at least to: decode attribute video data and displacement video data from the same video frames and subpicture frames, wherein the video frames and subpicture frame comprise displacement pixels and attribute pixels.

Example 31. A method including: receiving mesh data; determining a number of subdivisions for the mesh data, wherein a subdivision of the subdivisions comprises a level of detail level, wherein the number of subdivisions comprises a subdivision count; calculating displacement values for the subdivisions; packing the displacement values for the subdivisions in a rectangular region of a video frame; encoding the video frame; and signaling in or along a video-based dynamic mesh coding bitstream mapping information indicating a relation between displacement values for level of detail levels and regions of the video frame.

Example 32. A method including: receiving a video-based dynamic mesh coding bitstream comprising mesh data; extracting from the video-based dynamic mesh coding bitstream a number of level of detail levels and mapping information indicating a relation between displacement values for the level of detail levels and regions of a video frame; receiving level of detail information, wherein the level of detail information comprises a level of detail threshold; extracting and decoding the displacement values as indicated by the mapping information from a video substream corresponding to level of detail levels that are below or equal to the level of detail threshold; and reconstructing a level of detail level of the mesh data using the extracted and decoded displacement values.

Example 33. An apparatus including: means for receiving mesh data; means for determining a number of subdivisions for the mesh data, wherein a subdivision of the subdivisions comprises a level of detail level, wherein the number of subdivisions comprises a subdivision count; means for calculating displacement values for the subdivisions; means for packing the displacement values for the subdivisions in a rectangular region of a video frame; means for encoding the video frame; and means for signaling in or along a video-based dynamic mesh coding bitstream mapping information indicating a relation between displacement values for level of detail levels and regions of the video frame.

Example 34. An apparatus including: means for receiving a video-based dynamic mesh coding bitstream comprising mesh data; means for extracting from the video-based dynamic mesh coding bitstream a number of level of detail levels and mapping information indicating a relation between displacement values for the level of detail levels and regions of a video frame; means for receiving level of detail information, wherein the level of detail information comprises a level of detail threshold; means for extracting and decoding the displacement values as indicated by the mapping information from a video substream corresponding to level of detail levels that are below or equal to the level of detail threshold; and means for reconstructing a level of detail level of the mesh data using the extracted and decoded displacement values.

Example 35. A non-transitory computer readable medium including program instructions stored thereon for performing at least the following: receiving mesh data; determining a number of subdivisions for the mesh data, wherein a subdivision of the subdivisions comprises a level of detail level, wherein the number of subdivisions comprises a subdivision count; calculating displacement values for the subdivisions; packing the displacement values for the subdivisions in a rectangular region of a video frame; encoding the video frame; and signaling in or along a video-based dynamic mesh coding bitstream mapping information indicating a relation between displacement values for level of detail levels and regions of the video frame.

Example 36. A non-transitory computer readable medium including program instructions stored thereon for performing at least the following: receiving a video-based dynamic mesh coding bitstream comprising mesh data; extracting from the video-based dynamic mesh coding bitstream a number of level of detail levels and mapping information indicating a relation between displacement values for the level of detail levels and regions of a video frame; receiving level of detail information, wherein the level of detail information comprises a level of detail threshold; extracting and decoding the displacement values as indicated by the mapping information from a video substream corresponding to level of detail levels that are below or equal to the level of detail threshold; and reconstructing a level of detail level of the mesh data using the extracted and decoded displacement values.

Example 37. The apparatus of any of examples 1 to 15, wherein the apparatus is further caused to: signal an atlas sequence parameter set video-based dynamic mesh coding extension flag; wherein a value of the atlas sequence parameter set video-based dynamic mesh coding extension flag being equal to 1 specifies that patches contain data per level of detail; wherein a value of the atlas sequence parameter set video-based dynamic mesh coding extension flag being equal to 0 specifies that a patch contains data of all level of details.

Example 38. The apparatus of any of examples 1 to 15 or 37, wherein the apparatus is further caused to: signal a mesh patch data unit level of detail index per tile identifier and per patch index; wherein the mesh patch data unit level of detail index indicates a level of detail index that data in a current patch with an index corresponding to the patch index and in a current atlas tile with an identifier corresponding to the tile tiler identifier applies to.

Example 39. The apparatus of example 38, wherein when the signaling of the mesh patch data unit level of detail index per tile identifier and per patch index is not present, a value of the mesh patch data unit level of detail index per tile identifier and per patch index is inferred to be equal to zero.

Example 40. The apparatus of any of examples 1 to 15 or 37 to 39, wherein the apparatus is further caused to signal level of detail extraction information with a level of detail extraction information payload supplemental enhancement information syntax element, wherein the level of detail extraction information signaled with the level of detail extraction information payload supplemental enhancement information syntax element indicates: an extractable unit type identifier that indicates a type of extractable units within the video-based dynamic mesh coding bitstream; a number of one or more submeshes; a submesh identifier per submesh; a subdivision iteration count per submesh; a motion constrained tile set identifier corresponding to a region, wherein the motion constrained tile set identifier is indicated per submesh, and per displacement data refinement level or subdivision iteration; and a subpicture identifier corresponding to a region, wherein the subpicture identifier is indicated per submesh, and per displacement data refinement level or subdivision iteration.

Example 41. The apparatus of example 40, wherein: a value of 0 for the extractable unit type index specifies that displacement video is encoded with motion-constrained tile sets, a value of 1 for the extractable unit type index specifies that displacement video is encoded with a subpicture, and the motion constrained tile set identifier is the same as: a motion constrained tile set index of a motion constrained tile set corresponding to a first index in a motion constrained tile set corresponding to a second index, wherein the motion constrained tile set corresponding to the second index is associated with an extraction information set corresponding to a third index.

Example 42. The apparatus of any of examples 16 to 30, wherein the apparatus is further caused to: receive signaling of an atlas sequence parameter set video-based dynamic mesh coding extension flag; wherein a value of the atlas sequence parameter set video-based dynamic mesh coding extension flag being equal to 1 specifies that patches contain data per level of detail; wherein a value of the atlas sequence parameter set video-based dynamic mesh coding extension flag being equal to 0 specifies that a patch contains data of all level of details; and reconstruct the level of detail level of the mesh data based on the signaling of the atlas sequence parameter set video-based dynamic mesh coding extension flag.

Example 43. The apparatus of any of examples 16 to 30 or 42, wherein the apparatus is further caused to: receiving signaling of a mesh patch data unit level of detail index per tile identifier and per patch index; wherein the mesh patch data unit level of detail index indicates a level of detail index that data in a current patch with an index corresponding to the patch index and in a current atlas tile with an identifier corresponding to the tile tiler identifier applies to; and reconstruct the level of detail level of the mesh data based on the signaling of the mesh patch data unit level of detail index per tile identifier and per patch index.

Example 44. The apparatus of example 43, wherein the apparatus is further caused to: infer a value of the mesh patch data unit level of detail index that is signaled per tile identifier and per patch index to be equal to zero, when the signaling of the mesh patch data unit level of detail index that is signaled per tile identifier and per patch index is not present.

Example 45. The apparatus of any of examples 16 to 30 or 42 to 44, wherein the apparatus is further caused to: receive signaling of level of detail extraction information with a level of detail extraction information payload supplemental enhancement information syntax element, wherein the level of detail extraction information signaled with the level of detail extraction information payload supplemental enhancement information syntax element indicates: an extractable unit type identifier that indicates a type of extractable units within the video-based dynamic mesh coding bitstream; a number of one or more submeshes; a submesh identifier per submesh; a subdivision iteration count per submesh; a motion constrained tile set identifier corresponding to a region, wherein the motion constrained tile set identifier is indicated per submesh, and per displacement data refinement level or subdivision iteration; and a subpicture identifier corresponding to a region, wherein the subpicture identifier is indicated per submesh, and per displacement data refinement level or subdivision iteration; and reconstruct the level of detail level of the mesh data based on the signaling of the level of detail extraction information with a level of detail extraction information payload supplemental enhancement information syntax element.

Example 46. The apparatus of example 45, wherein: a value of 0 for the extractable unit type index specifies that displacement video is encoded with motion-constrained tile sets, a value of 1 for the extractable unit type index specifies that displacement video is encoded with a subpicture, and the motion constrained tile set identifier is the same as: a motion constrained tile set index of a motion constrained tile set corresponding to a first index in a motion constrained tile set corresponding to a second index, wherein the motion constrained tile set corresponding to the second index is associated with an extraction information set corresponding to a third index.

References to a 'computer', 'processor', etc. should be understood to encompass not only computers having different architectures such as single/multi-processor architectures and sequential/parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, etc.

As used herein, the term 'circuitry', 'circuit' and variants may refer to any of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and one or more memories that work together to cause an apparatus to perform various functions, and (c) circuits, such as a microprocessor(s) or a portion of a microprocessor(s), that require software or firmware for operation, even when the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and when applicable to the particular element, a baseband integrated circuit or applications processor integrated circuit for a mobile phone or a similar integrated circuit in a server, a cellular network device, or another network device. Circuitry or circuit may also be used to mean a function or a process used to execute a method.

The term "non-transitory," as used herein, is a limitation of the medium itself (i.e., tangible, not a signal) as opposed to a limitation on data storage persistency (e.g., RAM vs. ROM).

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The following acronyms and abbreviations that may be found in the specification and/or the drawing figures are defined as follows (the abbreviations may be appended with each other or with other characters using e.g. a hyphen or dash (-), and may be case insensitive):

2D two-dimensional
3D three-dimensional
ACL atlas coding layer
AFPS atlas frame parameter set
ASIC application specific integrated circuit
ASPS atlas sequence parameter set
asve atlas sequence parameter set V-DMC extension
CABAC context-adaptive binary arithmetic coding
CPU central processing unit
CTU coding tree unit
Exp exponential
fl(n) float using n bits
FPGA field programmable gate array
HEVC high efficiency video coding
HLS high level syntax
ID identifier
IEC International Electrotechnical Commission
idx, Idx index
I/F interface
I/O input/output
ISO International Organization for Standardization
lei LoD extraction information
LOD, LOD, lod level of detail
MCTS, mcts motion constrained tile set
mdu meshpatch data unit
MPEG moving picture experts group
MUX multiplexer
NAL network abstraction layer
N/W network
PTL profile tier level
RAM random access memory
ROM read only memory
SEI supplemental enhancement information
SON self-organizing/optimizing network
subpic subpicture
ue (v) unsigned integer 0-th order Exp-Golomb-coded syntax element with the left bit first.
UI user interface
u(n) unsigned integer using n bits (e.g. u(2))
USB universal serial bus
V3C visual volumetric video-based coding
V-DMC, VDMC video-based dynamic mesh coding
VPS video parameter set
VVC versatile video coding

What is claimed is:

1. An apparatus comprising:
at least one processor; and
at least one memory storing instructions that, when executed by the at least one processor, cause the apparatus at least to:
receive mesh data;
determine a number of subdivisions for the mesh data, wherein a subdivision of the subdivisions comprises a level of detail level, wherein the number of subdivisions comprises a subdivision count;
calculate displacement values for the subdivisions;
pack the displacement values for the subdivisions in a rectangular region of a video frame;
encode the video frame; and
signal in or along a video-based dynamic mesh coding bitstream mapping information indicating a relation between displacement values for level of detail levels and regions of the video frame.

2. The apparatus of claim 1, wherein the apparatus is further caused to:

configure the video frame and the displacement values for different level of detail levels such that a resolution of the video frame is less than or equal to a maximum resolution allowed by a profile tier level of a target video decoder.

3. The apparatus of claim 1, wherein the apparatus is further caused to configure the video frame and the displacement values for different level of detail levels such that at least one or more of the following applies:

the video frame does not contain any regions with empty data, or the video frame does not contain any regions with data not used for decoding, or a number of regions of the video frame with empty data is below a threshold number of empty data regions, wherein the threshold number of empty data regions is based on a bitrate overhead that results from including the empty data, or a number of regions of the video frame with data not used for decoding is below a threshold number of empty data regions not used for decoding, wherein the threshold number of empty data regions not used for decoding is based on a bitrate overhead that results from including the empty data regions not used for decoding, or wherein the threshold number of empty data regions not used for decoding is received from a system user based on a manual setting by the system user.

4. The apparatus of claim 1, wherein the apparatus is further caused to:

configure the video frame to contain at least one region with empty data;

encode the at least one region with empty data with substitutable subpictures or slices or tiles;

wherein the substitutable subpictures or slices or tiles are not part of packed regions of the video frame having displacement information.

5. The apparatus of claim 1, wherein the apparatus is further caused to:

determine the subdivision count based on input parameters to an encoder, wherein the apparatus comprises the encoder.

6. The apparatus of claim 1, wherein the apparatus is further caused to:

sort the displacement values by level of detail level, wherein the sorting follows a vertex traversal order.

7. The apparatus of claim 1, wherein the video frame comprises multiple sub-streams of video-based dynamic mesh coding data, wherein one sub-stream of the multiple sub-streams comprises texture information, and another sub-stream of the multiple sub-streams comprises displacement information.

8. The apparatus of claim 1, wherein displacement data for a level of detail level is mapped to a separate region that is aligned to boundaries of a coding tree unit.

9. The apparatus of claim 8, wherein at least one or more of the following applies to the separate region:

the separate region comprises a high efficiency video coding slice, or the separate region comprises a rectangular tile, or the separate region comprises a rectangular tile, and the tile comprises a motion constrained tile set such that motion compensation is constrained to refer to a same tile location in reconstructed reference frames, or the separate region comprises a versatile video coding subpicture.

10. The apparatus of claim 1, wherein the mapping information indicating the relation between displacement values for level of detail levels and regions of the video frame signaled in or along the video-based dynamic mesh coding bitstream is provided in an atlas bitstream.

11. The apparatus of claim 1, wherein the apparatus is further caused to:

encode the rectangular region of the video frame as one or more video substreams, wherein a video substream of the one or more video substreams comprises a profile, tier, or level of detail level.

12. The apparatus of claim 1, wherein the apparatus is further caused to:

determine attribute video data for the subdivisions; and pack the attribute video data for the subdivisions in a rectangular region of a video frame.

13. The apparatus of claim 1, wherein the apparatus is further caused to:

encode attribute video data using subpictures into respective attribute video substreams, based on the subdivisions.

14. The apparatus of claim 1, wherein the apparatus is further caused to:

encode displacement video data using subpictures into respective displacement video substreams, based on the subdivisions.

15. The apparatus of claim 1, wherein the apparatus is further caused to:

pack attribute video data and displacement video data into the same video frames and subpicture frames, wherein the video frames and subpicture frame comprise displacement pixels and attribute pixels.

16. The apparatus of claim 1, wherein the apparatus is further caused to:

signal an atlas sequence parameter set video-based dynamic mesh coding extension flag;

wherein a value of the atlas sequence parameter set video-based dynamic mesh coding extension flag being equal to 1 specifies that patches contain data per level of detail;

wherein a value of the atlas sequence parameter set video-based dynamic mesh coding extension flag being equal to 0 specifies that a patch contains data of all level of details.

17. The apparatus of claim 1, wherein the apparatus is further caused to:

signal a mesh patch data unit level of detail index per tile identifier and per patch index;

wherein the mesh patch data unit level of detail index indicates a level of detail index that data in a current patch with an index corresponding to the patch index and in a current atlas tile with an identifier corresponding to the tile tiler identifier applies to.

18. The apparatus of claim 17, wherein when the signaling of the mesh patch data unit level of detail index per tile identifier and per patch index is not present, a value of the mesh patch data unit level of detail index per tile identifier and per patch index is inferred to be equal to zero.

19. The apparatus of claim 1, wherein the apparatus is further caused to signal level of detail extraction information with a level of detail extraction information payload supplemental enhancement information syntax element, wherein the level of detail extraction information signaled with the level of detail extraction information payload supplemental enhancement information syntax element indicates:

an extractable unit type identifier that indicates a type of extractable units within the video-based dynamic mesh coding bitstream;
a number of one or more submeshes;
a submesh identifier per submesh;
a subdivision iteration count per submesh;
a motion constrained tile set identifier corresponding to a region, wherein the motion constrained tile set identifier is indicated per submesh, and per displacement data refinement level or subdivision iteration; and
a subpicture identifier corresponding to a region, wherein the subpicture identifier is indicated per submesh, and per displacement data refinement level or subdivision iteration.

20. The apparatus of claim 19, wherein:
a value of 0 for the extractable unit type index specifies that displacement video is encoded with motion-constrained tile sets,
a value of 1 for the extractable unit type index specifies that displacement video is encoded with a subpicture, and
the motion constrained tile set identifier is the same as: a motion constrained tile set index of a motion constrained tile set corresponding to a first index in a motion constrained tile set corresponding to a second index, wherein the motion constrained tile set corresponding to the second index is associated with an extraction information set corresponding to a third index.

21. An apparatus comprising:
at least one processor; and
at least one memory storing instructions that, when executed by the at least one processor, cause the apparatus at least to:
receive a video-based dynamic mesh coding bitstream comprising mesh data;
extract from the video-based dynamic mesh coding bitstream a number of level of detail levels and mapping information indicating a relation between displacement values for the level of detail levels and regions of a video frame;
receive level of detail information, wherein the level of detail information comprises a level of detail threshold;
extract and decode the displacement values as indicated by the mapping information from a video substream corresponding to level of detail levels that are below or equal to the level of detail threshold; and
reconstruct a level of detail level of the mesh data using the extracted and decoded displacement values.

22. The apparatus of claim 21, wherein the video frame and the displacement values for different level of detail levels are configured such that a resolution of the video frame is less than or equal to a maximum resolution allowed by a profile tier level of the apparatus, wherein the apparatus comprises a target video decoder.

23. The apparatus of claim 21, wherein the video frame and the displacement values for different level of detail levels are configured such that at least one or more of the following applies:
the video frame does not contain any regions with empty data, or
the video frame does not contain any regions with data not used for decoding, or
a number of regions of the video frame with empty data is below a threshold number of empty data regions, wherein the threshold number of empty data regions is based on a bitrate overhead that results from including the empty data, or
a number of regions of the video frame with data not used for decoding is below a threshold number of empty data regions not used for decoding, wherein the threshold number of empty data regions not used for decoding is based on a bitrate overhead that results from including the empty data regions not used for decoding, or wherein the threshold number of empty data regions not used for decoding is based on a manual setting by a system user.

24. The apparatus of claim 21, wherein the apparatus is further caused to:
decode substitutable subpictures or slices or tiles from at least one region of the video frame with empty data;
wherein the substitutable subpictures or slices or tiles are not part of packed regions of the video frame having displacement information.

25. The apparatus of claim 21, wherein the number of level of detail levels comprises a subdivision count, wherein the subdivision count is based on input parameters to an encoder from which the video-based dynamic mesh coding bitstream is received.

26. The apparatus of claim 21, wherein the displacement values are sorted by level of detail level, wherein the sorting follows a vertex traversal order.

27. The apparatus of claim 21, wherein the video frame comprises multiple sub-streams of video-based dynamic mesh coding data, wherein one sub-stream of the multiple sub-streams comprises texture information, and another sub-stream of the multiple sub-streams comprises displacement information.

28. The apparatus of claim 21, wherein displacement data for a level of detail level is mapped to a separate region that is aligned to boundaries of a coding tree unit.

29. The apparatus of claim 28, wherein at least one or more of the following applies to the separate region:
the separate region comprises a high efficiency video coding slice, or
the separate region comprises a rectangular tile, or
the separate region comprises a rectangular tile, and the tile comprises a motion constrained tile set such that motion compensation is constrained to refer to a same tile location in reconstructed reference frames, or
the separate region comprises a versatile video coding subpicture.

30. The apparatus of claim 21, wherein the mapping information indicating the relation between displacement values for the level of detail levels and regions of the video frame extracted from the video-based dynamic mesh coding bitstream is provided in an atlas bitstream.

31. The apparatus of claim 21, wherein the level of detail information is received from a rendering engine or other application entity.

32. The apparatus of claim 21, wherein the apparatus is further caused to:
decode attribute video data from the video-based dynamic mesh coding bitstream; and
reconstruct a level of detail level of the mesh data using the decoded attribute video data.

33. The apparatus of claim 21, wherein the apparatus is further caused to:
decode attribute video data from subpictures from respective attribute video substreams, based on the level of detail levels.

34. The apparatus of claim 21, wherein the apparatus is further caused to:

decode displacement video data from subpictures from respective displacement video substreams, based on the level of detail levels.

35. The apparatus of claim 21, wherein the apparatus is further caused to:

decode attribute video data and displacement video data from the same video frames and subpicture frames, wherein the video frames and subpicture frame comprise displacement pixels and attribute pixels.

36. The apparatus of claim 21, wherein the apparatus is further caused to:

receive signaling of an atlas sequence parameter set video-based dynamic mesh coding extension flag;

wherein a value of the atlas sequence parameter set video-based dynamic mesh coding extension flag being equal to 1 specifies that patches contain data per level of detail;

wherein a value of the atlas sequence parameter set video-based dynamic mesh coding extension flag being equal to 0 specifies that a patch contains data of all level of details; and reconstruct the level of detail level of the mesh data based on the signaling of the atlas sequence parameter set video-based dynamic mesh coding extension flag.

37. The apparatus of claim 21, wherein the apparatus is further caused to:

receiving signaling of a mesh patch data unit level of detail index per tile identifier and per patch index;

wherein the mesh patch data unit level of detail index indicates a level of detail index that data in a current patch with an index corresponding to the patch index and in a current atlas tile with an identifier corresponding to the tile tiler identifier applies to; and reconstruct the level of detail level of the mesh data based on the signaling of the mesh patch data unit level of detail index per tile identifier and per patch index.

38. The apparatus of claim 37, wherein the apparatus is further caused to:

infer a value of the mesh patch data unit level of detail index that is signaled per tile identifier and per patch index to be equal to zero, when the signaling of the mesh patch data unit level of detail index that is signaled per tile identifier and per patch index is not present.

39. The apparatus of claim 21, wherein the apparatus is further caused to:

receive signaling of level of detail extraction information with a level of detail extraction information payload supplemental enhancement information syntax element, wherein the level of detail extraction information signaled with the level of detail extraction information payload supplemental enhancement information syntax element indicates:

an extractable unit type identifier that indicates a type of extractable units within the video-based dynamic mesh coding bitstream;

a number of one or more submeshes;

a submesh identifier per submesh;

a subdivision iteration count per submesh;

a motion constrained tile set identifier corresponding to a region, wherein the motion constrained tile set identifier is indicated per submesh, and per displacement data refinement level or subdivision iteration; and a subpicture identifier corresponding to a region, wherein the subpicture identifier is indicated per submesh, and per displacement data refinement level or subdivision iteration; and reconstruct the level of detail level of the mesh data based on the signaling of the level of detail extraction information with a level of detail extraction information payload supplemental enhancement information syntax element.

40. The apparatus of claim 39, wherein:

a value of 0 for the extractable unit type index specifies that displacement video is encoded with motion-constrained tile sets, a value of 1 for the extractable unit type index specifies that displacement video is encoded with a subpicture, and the motion constrained tile set identifier is the same as: a motion constrained tile set index of a motion constrained tile set corresponding to a first index in a motion constrained tile set corresponding to a second index, wherein the motion constrained tile set corresponding to the second index is associated with an extraction information set corresponding to a third index.

41. A method comprising:

receiving mesh data;

determining a number of subdivisions for the mesh data, wherein a subdivision of the subdivisions comprises a level of detail level, wherein the number of subdivisions comprises a subdivision count;

calculating displacement values for the subdivisions;

packing the displacement values for the subdivisions in a rectangular region of a video frame;

encoding the video frame; and signaling in or along a video-based dynamic mesh coding bitstream mapping information indicating a relation between displacement values for level of detail levels and regions of the video frame.

* * * * *